US010692503B2

(12) United States Patent
Jin et al.

(10) Patent No.: US 10,692,503 B2
(45) Date of Patent: Jun. 23, 2020

(54) VOICE DATA PROCESSING METHOD, APPARATUS AND STORAGE MEDIUM

(71) Applicant: TENCENT TECHNOLOGY (SHENZHEN) COMPANY LIMITED, Shenzhen, Guangdong (CN)

(72) Inventors: Xingming Jin, Guangdong (CN); Wei Li, Guangdong (CN); Fangmai Zheng, Guangdong (CN); Fuzhang Wu, Guangdong (CN); Bilei Zhu, Guangdong (CN); Binghua Qian, Guangdong (CN); Ke Li, Guangdong (CN); Yongjian Wu, Guangdong (CN); Feiyue Huang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 180 days.

(21) Appl. No.: 15/764,573

(22) PCT Filed: Mar. 3, 2017

(86) PCT No.: PCT/CN2017/075522
§ 371 (c)(1),
(2) Date: Mar. 29, 2018

(87) PCT Pub. No.: WO2017/162017
PCT Pub. Date: Sep. 28, 2017

(65) Prior Publication Data
US 2018/0286410 A1 Oct. 4, 2018

(30) Foreign Application Priority Data

Mar. 25, 2016 (CN) .......................... 2016 1 0178300

(51) Int. Cl.
*G10L 17/20* (2013.01)
*G10L 17/08* (2013.01)
(Continued)

(52) U.S. Cl.
CPC .............. *G10L 17/08* (2013.01); *G10L 17/20* (2013.01); *G10L 25/21* (2013.01); *G10L 17/04* (2013.01)

(58) Field of Classification Search
CPC ....... G10L 17/005; G10L 17/02; G10L 17/18; G10L 17/08; G10L 17/06; G10L 17/04;
(Continued)

(56) References Cited

U.S. PATENT DOCUMENTS 9,373,330 B2 * 6/2016 Cumani .................. G10L 17/06
9,431,016 B2 * 8/2016 Aviles-Casco .......... G10L 17/00
(Continued)

FOREIGN PATENT DOCUMENTS

CN     101404160 A     4/2009
CN     101651694 A     2/2010
(Continued)

OTHER PUBLICATIONS

Wei Rao et al., "Boosting the Performance of I-Vector Based Speaker Verification via Utterance Partitioning", IEEE Transactions on Audio, Speech and Language Processing, IEEE, US vol. 21, No. 5, May 2013, pp. 1012-1022. (Year: 2013).*
(Continued)

*Primary Examiner* — Vijay B Chawan
(74) *Attorney, Agent, or Firm* — Sughrue Mion, PLLC

(57) ABSTRACT

A voice data processing method and apparatus are provided. The method includes obtaining an I-Vector vector of each of voice samples, and determining a target seed sample in the voice samples. A first cosine distance is calculated between an I-Vector vector of the target seed sample and an I-Vector
(Continued)

vector of a target remaining voice sample, where the target remaining voice sample is a voice sample other than the target seed sample in the voice samples. A target voice sample is filtered from the voice samples or the target remaining voice sample according to the first cosine distance, to obtain a target voice sample whose first cosine distance is greater than a first threshold.

18 Claims, 18 Drawing Sheets

(51) Int. Cl.
*G10L 25/21* (2013.01)
*G10L 17/04* (2013.01)

(58) Field of Classification Search
CPC ......... G10L 17/20; G10L 17/12; G10L 17/17; G10L 17/14; G10L 17/22; G10L 15/20; G10L 15/14; G10L 15/142; G10L 15/222; G10L 15/265; G10L 19/018; G10L 21/034; G10L 15/02; G10L 25/51; G10L 25/84
USPC ................................. 704/239, 246, 250, 257
See application file for complete search history.

(56) References Cited

U.S. PATENT DOCUMENTS

| | | | | |
|---|---|---|---|---|
| 10,468,032 | B2* | 11/2019 | Huang | G10L 17/12 |
| 2011/0208524 | A1 | 8/2011 | Haughay | |
| 2014/0222428 | A1* | 8/2014 | Cumani | G10L 17/02 |
| | | | | 704/250 |
| 2014/0244257 | A1* | 8/2014 | Colibro | G10L 17/20 |
| | | | | 704/246 |
| 2015/0112684 | A1* | 4/2015 | Scheffer | G10L 17/14 |
| | | | | 704/257 |
| 2015/0127342 | A1* | 5/2015 | Sharifi | G10L 17/005 |
| | | | | 704/239 |
| 2016/0042739 | A1* | 2/2016 | Cumani | G10L 17/06 |
| | | | | 704/239 |
| 2016/0225373 | A1* | 8/2016 | Casado | G10L 15/20 |
| 2016/0329052 | A1* | 11/2016 | Aviles-Casco | G10L 17/00 |
| 2017/0186424 | A1* | 6/2017 | Melendo Casado | G10L 17/06 |
| 2018/0144742 | A1* | 5/2018 | Ye | G10L 15/02 |
| 2018/0233151 | A1* | 8/2018 | Li | G10L 17/20 |

FOREIGN PATENT DOCUMENTS

| | | |
|---|---|---|
| CN | 102723081 A | 10/2012 |
| CN | 103279581 A | 9/2013 |
| CN | 105139857 A | 12/2015 |
| CN | 105161093 A | 12/2015 |
| CN | 105869645 A | 8/2016 |
| JP | 2007-298876 A | 11/2007 |

OTHER PUBLICATIONS

Stephen Shum et al., "Unsupervised Speaker Adaptation based on the Cosine Similarity for Text-Independent Speaker Verification", The Speaker and Language Recognition Workshop—Odyssey 2010, Jun. 28, 2010, pp. 76-82. (Year: 2010).*
Najim Dehak et al., "Front-end Factor Analysis for Speaker Verification", IEEE Transactions on Audio, Speech and Language Processing, IEEE, US, vol. 19, No. 4, May 2011, pp. 788-789. (Year: 2011).*
Written Opinion in International Application No. PCT/CN2017/075522, dated Apr. 27, 2017.
Communication dated Aug. 6, 2019, from the Japanese Patent Office in counterpart Application No. 2018-552112.
Fumito Nishi et al., "Multimodal i-vectors for Speaker Diarization", Information Processing Society Technical Report, Speech and Language Processing (SLP),Information Processing Society of Japan, Jul. 17, 2015, vol. 2015-SLP-107, No. 4, pp. 1-6 (7 pages total).
Communication issued by the State Intellectual Property Office of the P.R.C. dated Nov. 13, 2018 in copenidng application No. 201610178300.8.
International Search Report for PCT/CN2017/075522 dated Apr. 27, 2017 [PCT/ISA/210].

* cited by examiner

VOICE DATA PROCESSING METHOD, APPARATUS AND STORAGE MEDIUM

CROSS-REFERENCE TO RELATED APPLICATIONS

This application is a National Stage Entry of International Application No. PCT/CN2017/075522, filed on Mar. 3, 2017, which claims priority from Chinese Patent Application No. 201610178300.8, filed with the Chinese Patent Office on Mar. 25, 2016, and entitled "VOICE DATA PROCESSING METHOD AND APPARATUS", the content of each of which are incorporated by reference herein in their entirety.

FIELD

This application relates to the field of data processing, and specifically, to a voice data processing method and apparatus.

BACKGROUND

In various fields of artificial intelligence, data is crucial, and many times, quality of data plays a decisive role. However, in actual situations, in most cases, quality of data is uneven, and data further needs to be processed. Generally, data processing is to remove "noise" from data, and retain actually required data. In the field of voiceprint recognition, in most cases, a voice sample of a voiceprint of a particular person obtained by using the Internet is impure, and in addition to including noise such as a voice of a nonhuman, usually, a speech of another person may be included. How to remove noise and a voice of another person by means of cleansing and only retain the voice sample of the voiceprint of the particular person is a main problem encountered at present.

Currently, to obtain a voice sample of a voiceprint of a particular person from voice data including noise and a voiceprint of another person, usually, a manual marking method is used. A specific voice sample belonging to the voiceprint of the particular person in a piece of voice data including the voiceprint of the particular person, the voiceprint of the another person, and noise is manually recognized, and a voice sample including noise and the voiceprint of the another person is manually cut off. When such a manual marking method is used to cleanse voice data, it is time-consuming and laborious, and efficiency is low.

For the foregoing problem, an effective solution is not provided yet at present.

SUMMARY

It is an aspect to provide a voice data processing method and apparatus that addresses at least some of the above-described technical problems with the manual marking method and that may improve voice data cleansing efficiency.

According to an aspect of one or more exemplary embodiments, there is provided a method. The method obtains an I-Vector vector of each of a plurality of voice samples. The method determines a target seed sample in the plurality of voice samples, and respectively calculates a first cosine distance between an I-Vector vector of the target seed sample and an I-Vector vector of a target remaining voice sample. The target remaining voice sample is a voice sample other than the target seed sample in the plurality of voice samples. The method filters a target voice sample from the plurality of voice samples or the target remaining voice sample according to the first cosine distance, to obtain a target voice sample whose first cosine distance is greater than a first threshold.

According to another aspect of one or more exemplary embodiments, there is provided an apparatus. The apparatus includes at least one memory configured to store computer program code; and at least one processor configured to access the at least one memory and operate according to the computer program code. The computer program code includes vector code, cosine distance code, and filtering code. The vector code is configured to cause the at least one processor to obtain an I-Vector vector of each of a plurality of voice samples, and determine a target seed sample in the plurality of voice samples. The cosine distance code is configured to cause the at least one processor to respectively calculate a cosine distance between an I-Vector vector of the target seed sample and an I-Vector vector of a target remaining voice sample, where the target remaining voice sample is a voice sample other than the target seed sample in the plurality of voice samples. The filtering code is configured to cause the at least one processor to filter a target voice sample from the plurality of voice samples or the target remaining voice sample according to the first cosine distance, to obtain a target voice sample whose first cosine distance is greater than a first threshold.

According to another aspect of one or more exemplary embodiments, there is provided a non-transitory computer-readable storage medium. The non-transitory computer-readable storage medium stores computer program code. The computer program code, when executed by a processor of a calculating apparatus, causes the calculating apparatus to obtain an I-Vector vector of each of a plurality of voice samples, and determine a target seed sample in the plurality of voice samples. The computer program code further causes the calculating apparatus to respectively calculate a first cosine distance between an I-Vector vector of the target seed sample and an I-Vector vector of a target remaining voice sample, where the target remaining voice sample is a voice sample other than the target seed sample in the plurality of voice samples. The computer program code further causes the calculating apparatus to filter a target voice sample from the plurality of voice samples or the target remaining voice sample according to the first cosine distance, to obtain a target voice sample whose first cosine distance is greater than a first threshold.

BRIEF DESCRIPTION OF THE DRAWINGS

The accompanying drawings described herein are used to provide further understanding of this application, and form a part of this application. Exemplary embodiments of this application and descriptions thereof are used for explaining this application, but do not constitute an improper limitation to this application. In the accompanying drawings.

DESCRIPTION OF EXEMPLARY EMBODIMENTS

Figure 1:
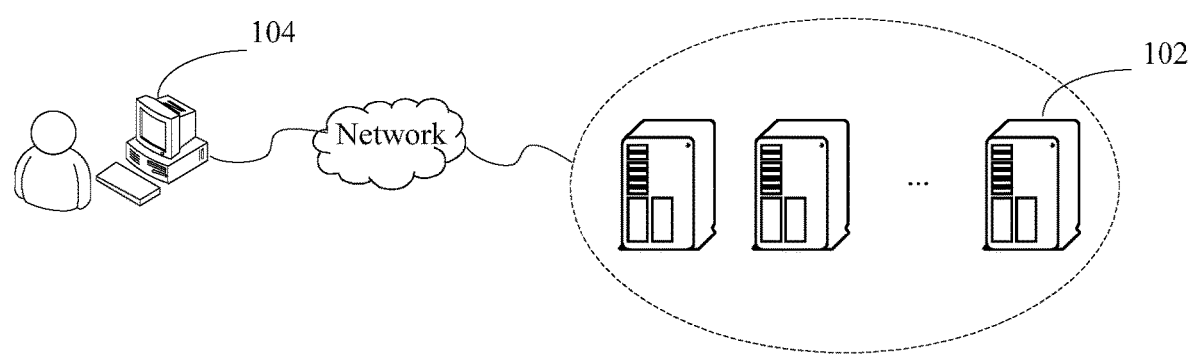
FIG. 1 is a schematic diagram of a hardware environment of a voice data processing method according to an exemplary embodiment.

To make a person skilled in the art understand solutions of the exemplary embodiments better, the following clearly and completely describes the technical solutions in the exemplary embodiments with reference to the accompanying drawings in which the exemplary embodiments are shown. The described exemplary embodiments are merely some but not all of the embodiments of this application. All other embodiments obtained by a person of ordinary skill in the art based on the exemplary embodiments described herein without creative efforts shall fall within the protection scope of described exemplary embodiments and the attached claims.

It should be noted that, in the specification, the claims, and the accompanying drawings of this application, the terms "first", "second", and the like are intended to distinguish between similar objects but do not necessarily indicate a specific order or sequence. It should be understood that the data used in this way are interchangeable in an appropriate case, so that the exemplary embodiments described herein may be implemented in an order other than the order illustrated or described herein. Moreover, the terms "include" and "contain" and any other variants thereof are intended to cover a non-exclusive inclusion. For example, a process, a method, a system, a product, or a device that includes a series of steps or units is not limited to the listed steps or units, but may include other steps or units not expressly listed or inherent to such a process, method, system, product, or device.

First, some nouns or terms that appear during description of the exemplary embodiments are applicable to the following explanations:

An I-Vector voiceprint recognition technology is also referred to as an identity factor identification technology, in which no attempt is made to forcedly separate speaker space and channel space, but a total variability space is directly set, and the total variability space includes all possible information of voice data. Then, by means of a factorial analysis method, a load factor of the total variability space is obtained, which is the I-Vector voiceprint recognition technology. A dimension thereof is far lower than that of a Gaussian supervector (GSV). On this factor, a simple method for distinguishing between speakers is used, that is, a distance between different speakers is made to be longer, and a distance between statements of a same speaker affected by noise is made to be shorter. Apparently, this is an objective of an existing discriminant analysis method. A difference between speakers is considered as an inter-class matrix, and a difference caused by noise is considered as intra-class matrix; and then, an I-vector matrix is estimated by applying an existing probability discriminant analysis method. An information vector, that is, an I-vector vector reflecting an identity of a speaker is mapped on the I-vector matrix.

According to the exemplary embodiments, a voice data processing method is provided.

The voice data processing method may be applied to a hardware environment including a server 102 and a terminal 104 shown in FIG. 1. As shown in FIG. 1, the server 102 is connected to the terminal 104 by using a network. The network includes, but is not limited, to a wide area network, a metropolitan area network, or a local area network. The terminal 104 is not limited to a personal computer (PC), a mobile phone, a tablet computer, or the like. In some exemplary embodiments, the voice data processing method may be performed by the server 102, or in other exemplary embodiments the voice data processing method may be performed by the terminal 104, or in still other exemplary embodiments the voice data processing method may be performed by both the server 102 and the terminal 104. The voice data processing method performed by the terminal 104 may be performed by a client application installed on the terminal 104.

Figure 2A:
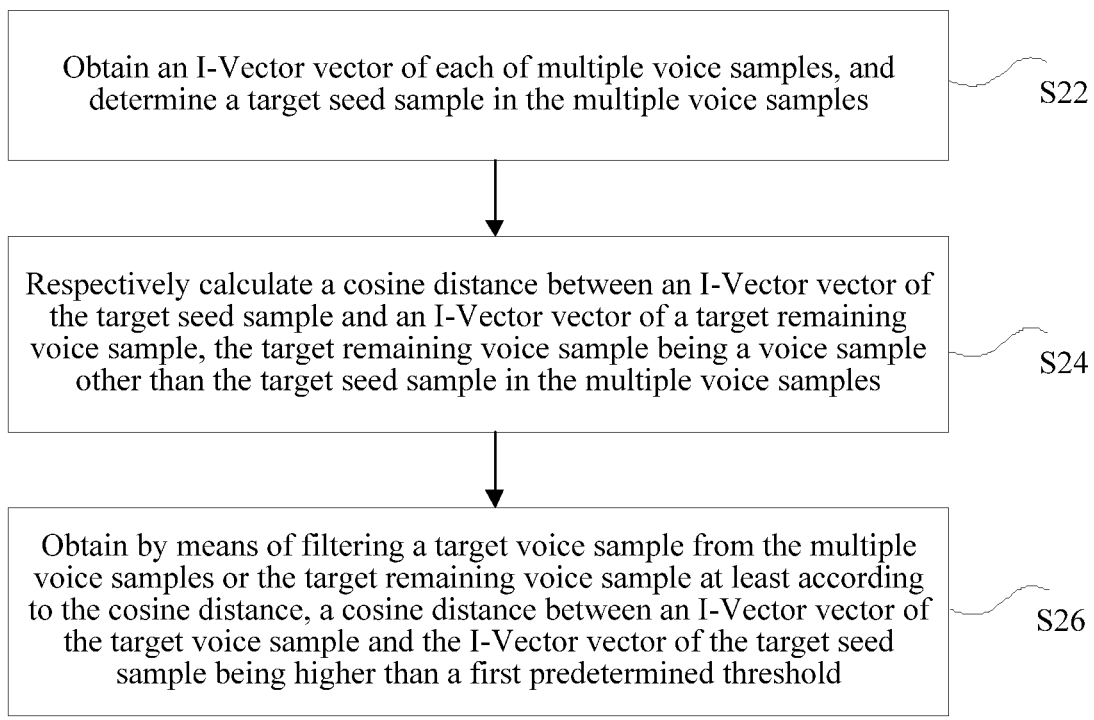
FIGS. 2A-2E are flowcharts of a voice data processing method according to exemplary embodiments.
Figure 2B:
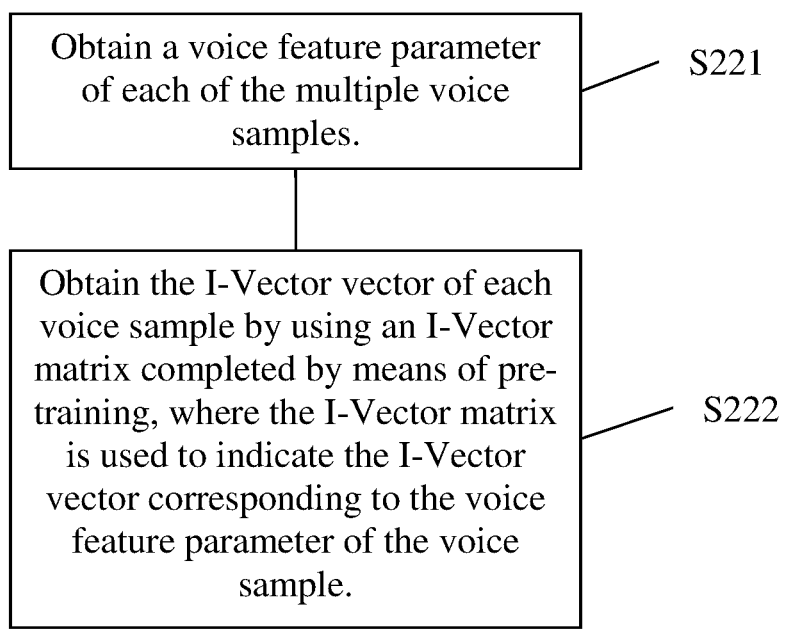
Figure 2C:
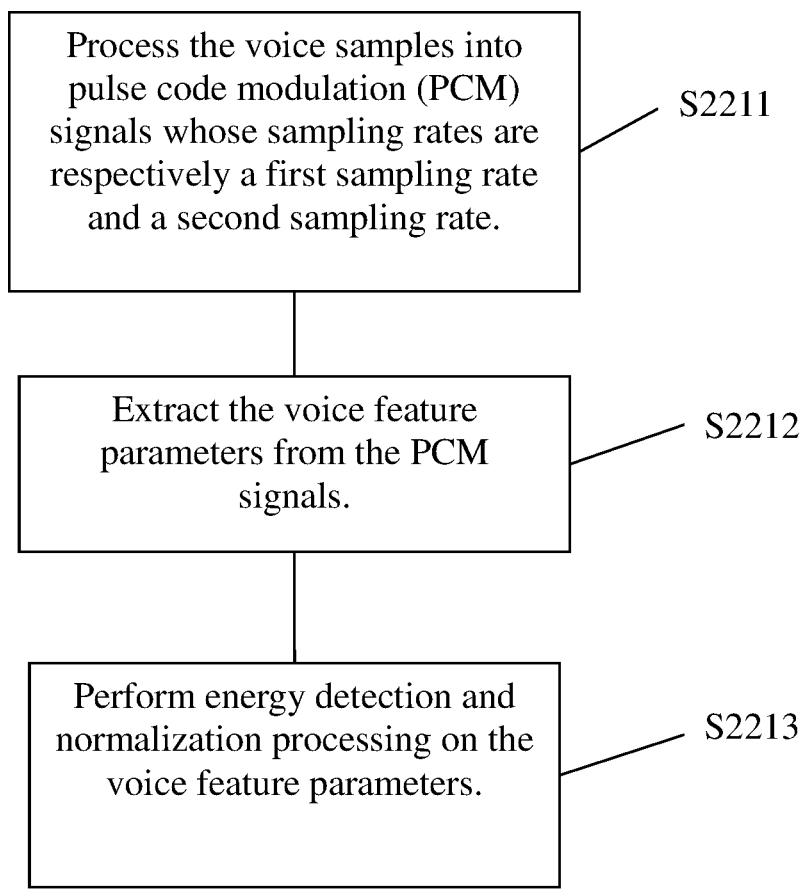

FIGS. 2A-2C are flowcharts of a voice data processing method according to exemplary embodiments. As shown in FIG. 2A, the method may include the following steps:

Step S22: Obtain an I-Vector vector of each of multiple voice samples, and determine a target seed sample in the multiple voice samples.

Step S24: Respectively calculate a cosine distance between an I-Vector vector of the target seed sample and an I-Vector vector of a target remaining voice sample, the target remaining voice sample being a voice sample other than the target seed sample in the multiple voice samples.

Step S26: Obtain by means of filtering a target voice sample from the multiple voice samples or the target remaining voice sample at least according to the cosine distance, a cosine distance between an I-Vector vector of the target voice sample and the I-Vector vector of the target seed sample being higher than a first predetermined threshold.

By means of step S22 to step S26, an I-Vector vector of each voice sample is obtained, and a target seed sample is determined in the voice samples; a cosine distance between an I-Vector vector of the target seed sample and an I-Vector vector of a target remaining voice sample is respectively calculated; and a target voice sample whose cosine distance to the I-Vector vector of the target seed sample is higher than a first predetermined threshold is obtained by means of filtering from multiple voice samples or the target remaining voice sample at least according to the cosine distance, to achieve an objective of automatically cleansing voice data without human intervention, thereby resolving a technical problem in the related technology that voice data cannot be adequately cleansed by using a manual marking method, leading to low voice data cleansing efficiency, and achieving a technical effect of improving the voice data cleansing efficiency.

It should be noted that, for any voice sample in one piece of voice data, one I-Vector vector of the voice sample may be obtained after processing. The I-Vector vector is an information vector used to reflect an identity of a speaker in an I-Vector matrix. A difference between voice samples may be represented by using a cosine distance between I-Vector vectors of two voice samples. If the cosine distance between the I-Vector vectors of the two voice samples is closer to 1, then the two voice samples are closer. Otherwise if the cosine distance between the I-Vector vectors of the two voice samples are further from 1, then the difference between the two voice samples is larger. For example, for two voice samples of a same particular person, a cosine distance between I-Vector vectors of the voice samples should be close to 1, and a difference between the two voice samples is very small. Therefore, in this exemplary embodiment, the voice samples are clustered based on the cosine distance between the I-Vector vectors of the voice samples, to achieve an objective of cleansing voice data.

For ease of understanding how to cleanse voice data by using the voice data processing method according to exemplary embodiments, first, how to obtain the I-Vector vector of each of the multiple voice samples in a technical solution provided in step S22 is described in detail, and details are as follows:

As shown in FIG. 2B, Step S22 of obtaining an I-Vector vector of each of multiple voice samples may include the following steps:

Step S221: Obtain a voice feature parameter of each of the multiple voice samples.

It should be noted that, one piece of voice data may include multiple voice samples. Each voice sample may correspond to a voiceprint of a particular person, a voiceprint of another person, and/or noise. Voice feature parameters of voice samples of the voiceprint of the particular person, the voiceprint of the another person, and the noise are different from each other. Therefore, the voice feature parameter may be used to represent voiceprint information of the voice sample. The voice feature parameter may include, but is not limited to, an included voiceprint type and information such as a frequency and intensity of each type of voiceprint.

As shown in FIG. 2C, Step S221 may include the following steps:

Step S2211: Process the voice samples into pulse code modulation (PCM) signals whose sampling rates are respectively a first sampling rate and a second sampling rate.

Step S2212: Extract the voice feature parameters from the PCM signals.

Step S2213: Perform energy detection and normalization processing on the voice feature parameters.

It should be noted that, the first sampling rate and the second sampling rate herein may be set and adjusted according to an actual requirement, and the first sampling rate is different from the second sampling rate. In other words, the first and second sampling rates are not specifically limited as long as the first and second sampling rates are different. In this exemplary embodiment, the voice samples are processed into the PCM signals having different sampling rates, and the voice feature parameters used to identify voiceprint information of the voice samples are extracted from the PCM signals, so that an effect of improving accuracy of the extracted voice feature parameters may be achieved. After the voice feature parameters are extracted, energy detection and normalization processing are performed on the voice feature parameters, so that an effect of improving stability and accuracy of the voice feature parameters may be achieved. It should be noted that, the voice feature parameters extracted from the PCM signals may be features into which first-order statistics and second-order statistics of MFCC features extracted from the PCM signals are spliced. It should be further noted that, to improve stability and accuracy of the extracted voice feature parameters, in this exemplary embodiment, voice activity detection or the like may be further performed on the extracted voice feature parameters. Details of the voice activation detection are described herein.

In an actual application scenario, in this exemplary embodiment, the voice samples may be processed, by using ffmpeg software, into PCM files whose first and second sampling rates are respectively 8 K and 16 bits. A specific operation command is: ffmpeg-y-loglevel quiet-i original voice file-acodec pam_s16le-ar 8000-ac 1 target voice file name.pcm. Then, an MFCC feature is extracted, and specifically, an MFCC feature of a frame length of 20 ms with 10 ms overlapping between two frames may be extracted by using a tool such as a matlab voicebox tool kit or an HTK speech recognition package. Generally, MFCC features of first 20 dimensions are extracted. Next, first-order statistics and second-order statistics of the MFCC features of 20 dimensions are obtained to be spliced into the voice feature parameter of the voice sample. Energy detection, voice activity detection, and normalization processing may be performed on the extracted MFCC features.

Step S222: Obtain the I-Vector vector of each voice sample by using an I-Vector matrix completed by means of pre-training, where the I-Vector matrix is used to indicate the I-Vector vector corresponding to the voice feature parameter of the voice sample.

It should be noted that, after the voice feature parameter of each voice sample is obtained, the I-Vector vector of each voice sample may be obtained by using the I-Vector matrix completed by means of pre-training. It should be noted that, the I-Vector matrix may be used to indicate the I-Vector vector corresponding to the voice feature parameter of the voice sample.

Figure 2D:
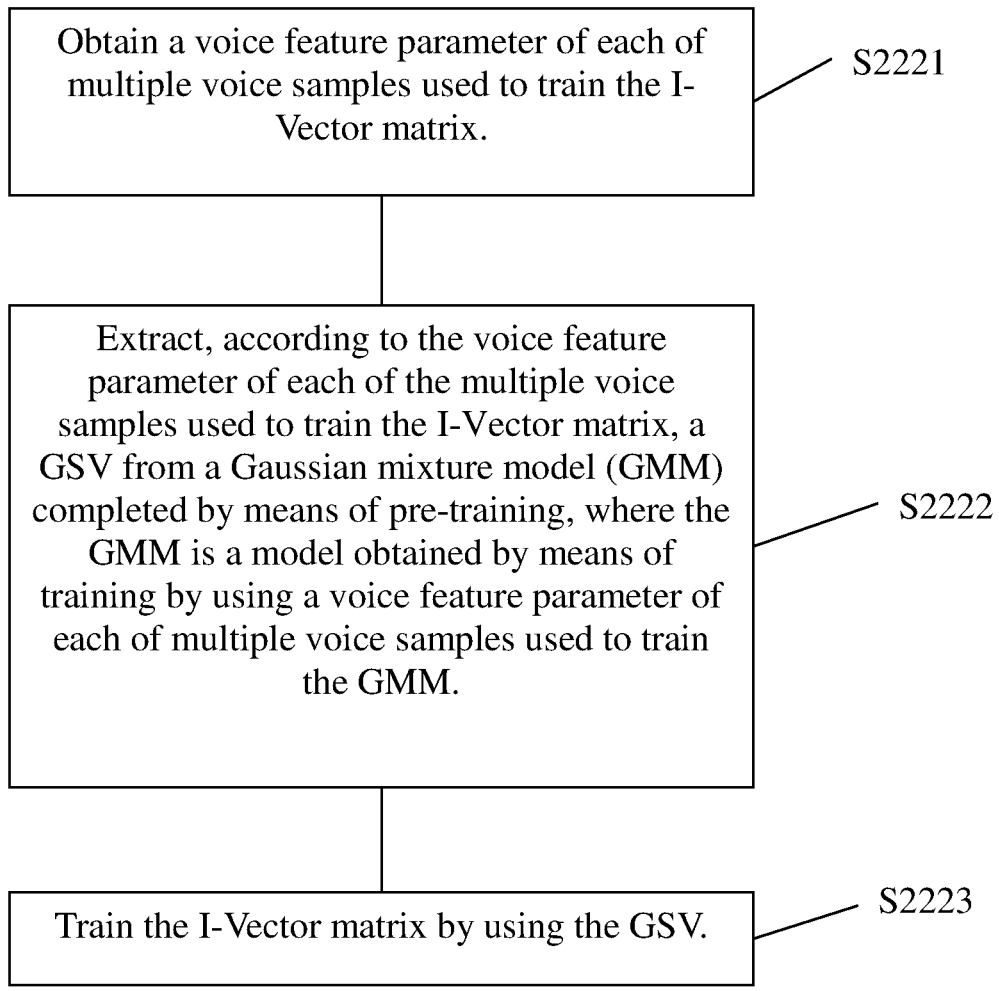

The I-Vector matrix may be obtained by means of training. That is, as shown in FIG. 2D, Step S222 may include the following steps:

Step S2221: Obtain a voice feature parameter of each of multiple voice samples used to train the I-Vector matrix.

It should be noted that, herein, the voice feature parameter of each of the multiple voice samples used to train the I-Vector matrix may be obtained by means of step S2211 to step S2213, and details are not described herein again. In an actual application scenario, voice data of more than 100 hours may be selected as training data for the I-Vector matrix, and the voice feature parameter of each voice sample may be obtained by means of step S2211 to step S2213.

Step S2222: Extract, according to the voice feature parameter of each of the multiple voice samples used to train the I-Vector matrix, a GSV from a Gaussian mixture model (GMM) completed by means of pre-training, where the GMM is a model obtained by means of training by using a voice feature parameter of each of multiple voice samples used to train the GMM.

It should be noted that, the GMM may be obtained by means of training by using the voice feature parameter of each of the multiple voice samples used to train the GMM. During actual training of the GMM, voice data of approximately 50 hours may be randomly selected as training data for a background model. After a voice feature parameter of each voice sample of the foregoing voice data is obtained according to step S2211 to step S2213, the GMM is trained by using the obtained voice feature parameter. Generally, more than 512 components are customized. Herein, it should be noted that, a uniform background model (UBM) is actually a large GMM, and is used to train a feature irrelevant to a particular speaker. The training data for the UBM includes as much as possible voice data of all people on various channels. Training of the UBM is training of the GMM. A used algorithm may be an EM algorithm, and when there is no convergence in the EM algorithm, it may be considered that the training is terminated.

After the voice feature parameter of each of the multiple voice samples used to train the I-Vector matrix is obtained, the GSV may be extracted by using the GMM completed by means of pre-training. The GSV is a super-high dimensional vector formed by splicing average values of GMMs.

Step S2223: Train the I-Vector matrix by using the GSV.

It should be noted that, an I-Vector technology is a cross-channel algorithm based on single space, in which information about speaker space and information about channel space are not distinguished. Any separate voice sample may be decomposed into a background model $m_0$ and $Tw_s$ reflecting a feature of each speaker. The GSV may be expressed as follows: $M_s = m_0 + Tw_s$, where $M_s$ is a C*F-dimensional GSV; $m_0$ is a C*F-dimensional supervector irrelevant to a particular speaker and irrelevant to a particular channel, and is obtained by splicing average vectors of UBMs; $w_s$ is an N-dimensional total variability factor, that is, an I-Vector, and is a group of random vectors conforming to standard normal distribution; and T is a CF*N-dimensional total variability space matrix. At a phase of training the I-Vector, the total variability space matrix T is estimated according to a large quantity of voice data training sets by using a factorial analysis algorithm. After the total variability space is obtained, a high-dimensional GSV is projected in total variability subspace indicated by the matrix T, to finally obtain a low-dimensional total variability factor, that is, the I-Vector vector.

Figure 3:
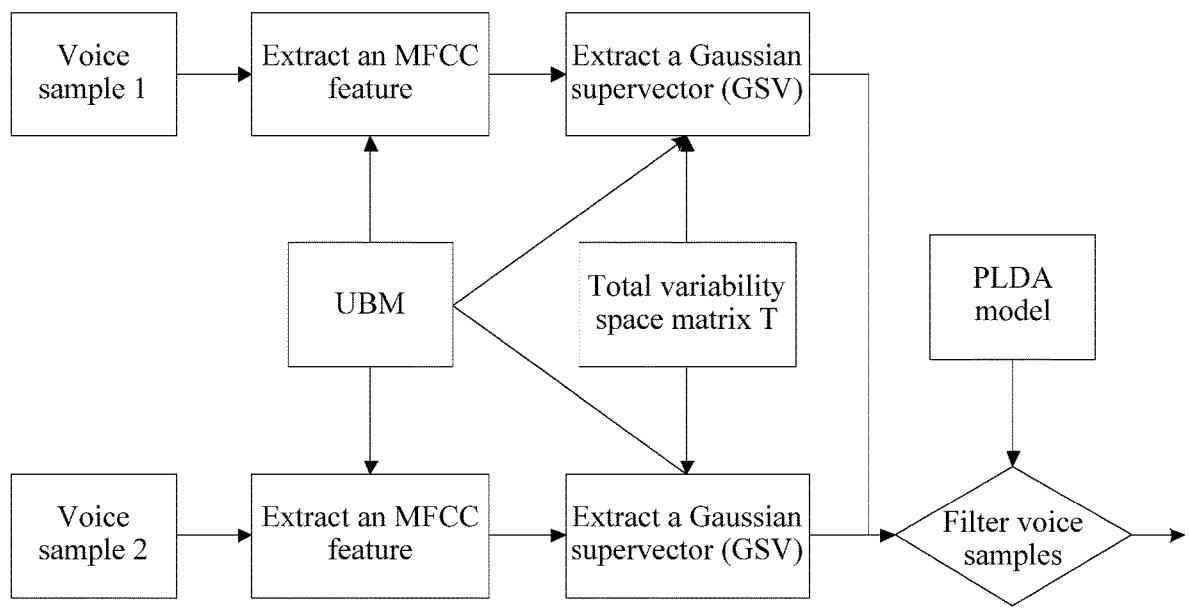
FIG. 3 is a schematic diagram of a process of obtaining an I-Vector vector according to an exemplary embodiment.

FIG. 3 is a schematic diagram of a process of obtaining an I-Vector vector according to an exemplary embodiment. As shown in FIG. 3, FIG. 3 only shows an example of a process of obtaining I-Vector vectors of two voice samples. It should be understood that, for another voice sample in multiple voice samples, an I-Vector vector of the voice sample may also be obtained by using the obtaining process shown in FIG. 3. That is, while two voice samples are shown in FIG. 3 for conciseness of description, the number of voice samples is not particularly limited. As shown in FIG. 3, first, an MFCC feature is extracted from the voice sample. Then, a GSV is extracted by using a UBM completed by means of pre-training. Next, the I-Vector vector is obtained by using a total variability space matrix T obtained by means of pre-training, that is, an I-Vector matrix. Finally, the voice sample is filtered according to the obtained I-Vector vector by using a linear discriminant analysis module (PLDA) model completed by means of pre-training.

In a technical solution provided in step S22, after the I-Vector vector of each of the multiple voice samples is obtained, the target seed sample is further determined in the multiple voice samples. The target seed sample may be obtained by splicing at least one of the multiple voice samples. A quantity of the at least one of the multiple voice samples that is spliced into the target seed sample may be adjusted according to audio duration actually required by the target seed sample.

Figure 4A:
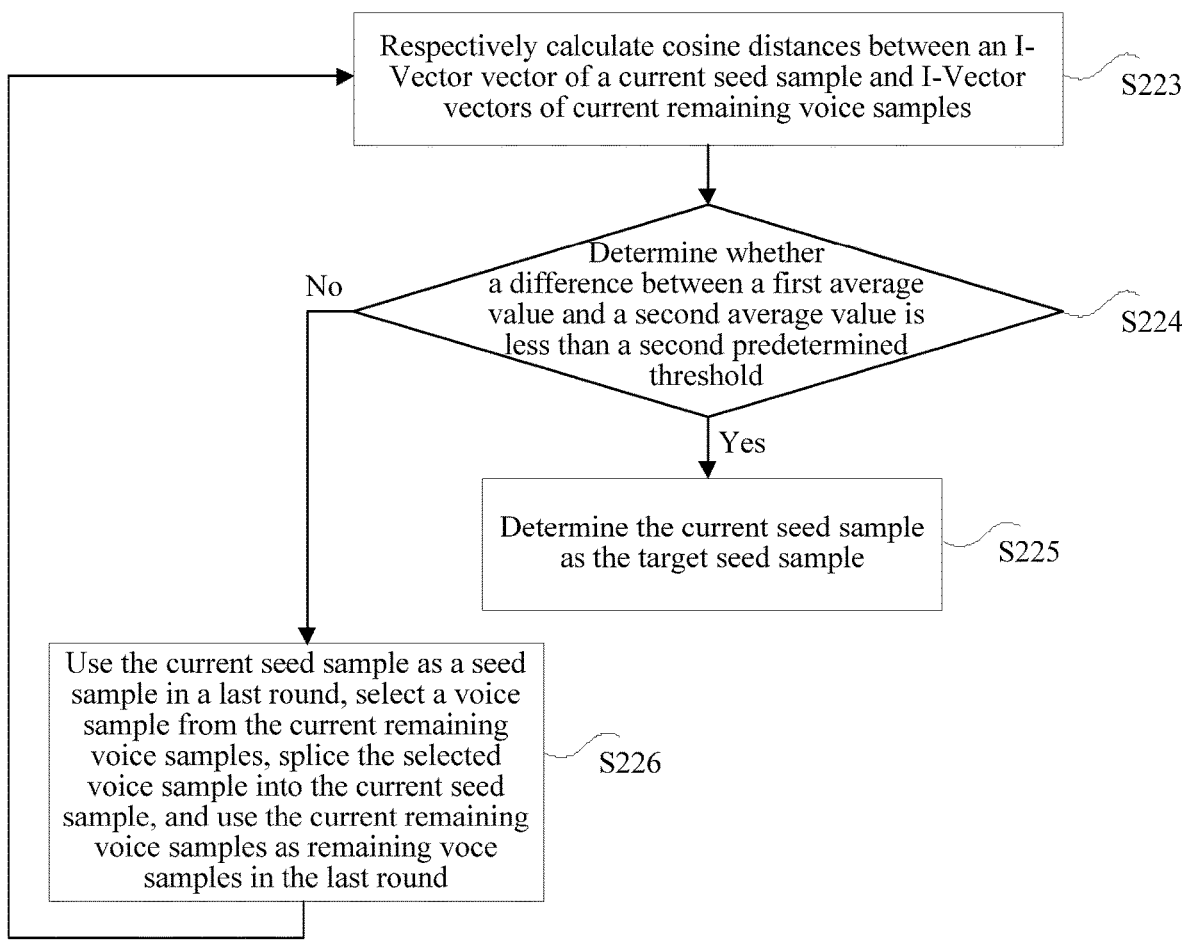
FIGS. 4A and 4B are flowcharts of determining a target seed sample in multiple target voice samples according to exemplary embodiments.

The target seed sample may be determined in the multiple voice samples by using the following iterative process. It should be noted that, initialization in the iterative process may include: initializing a current seed sample as a result obtained by splicing at least one of the multiple voice samples, and initializing a seed sample in a last round and remaining voice samples in the last round as empty. FIG. 4A is a flowchart of determining a target seed sample in multiple target voice samples according to an exemplary embodiment. As shown in FIG. 4A, the determining the target seed sample in the multiple voice samples may include: repeatedly performing the following operations, until the target seed sample is determined:

Step S223: Respectively calculate cosine distances between an I-Vector vector of the current seed sample and I-Vector vectors of current remaining voice samples, where the current remaining voice samples are voice samples other than the current seed sample in the multiple voice samples.

It should be noted that, a cosine distance between two vectors may be derived by using the following Euclidean dot product formula:

$$a \cdot b = |a||b| \cos \theta; \text{ and}$$

when two I-Vector vectors A and B are given, a cosine similarity $\theta$ between the two I-Vector vectors A and B is obtained by using a dot product and vector lengths, as shown in the following formula:

$$\text{similarity} = \cos\theta = \frac{A \times B}{|A||B|} = \frac{\sum_{i=1}^{n} A_i \times B_i}{\sqrt{\sum_{i=1}^{n} (A_i)^2} \times \sqrt{\sum_{i=1}^{n} (B_i)^2}},$$

where $A_i$ and $B_i$ respectively denote components of the vectors A and B. As may be learned from the foregoing formula, a similarity range is negative one (−1) to positive one (+1), where negative one (−1) indicates that directions to which the two vectors point are exactly opposite to each other, positive one (+1) indicates that directions of the two vectors are the same, zero (0) indicates that the two vectors are independent of each other, and a value between negative one (−1) and positive one (+1) indicates a similarity or a difference between the two vectors.

It should be noted that, there may be multiple current remaining voice samples other than the current seed sample in the multiple voice samples, and therefore, there are multiple cosine distances between the I-Vector vector of the current seed sample and the I-Vector vectors of the current remaining voice samples. The cosine distance between the I-Vector vector of each of the current remaining voice samples and the I-Vector vector of the current seed sample may be calculated by using the foregoing formula.

Step S224: Determine whether a difference between a first average value and a second average value is less than a second predetermined threshold.

The first average value is an average value of the cosine distances between the I-Vector vector of the current seed sample and the I-Vector vectors of the current remaining voice samples. The second average value is an average value of cosine distances between an I-Vector vector of the seed sample in the last round and I-Vector vectors of the remaining voice samples in the last round. The remaining voice samples in the last round are voice samples other than the seed sample in the last round in the multiple voice samples.

It should be noted that, the cosine distance between the I-Vector vector of the seed sample in the last round and the I-Vector vector of each of the remaining voice samples in the last round may also be calculated by using the foregoing formula. In this exemplary embodiment, each time a seed sample is determined, an average value of cosine distances between an I-Vector vector of the seed sample and I-Vector vectors of remaining voice samples is calculated. Starting from the initialization, after every two average values are calculated, in this exemplary embodiment, a difference between the calculated two average values is compared to determine whether the difference is less than the second predetermined threshold. It should be noted that, the second predetermined threshold may be set or adjusted according to an actual requirement.

When it is determined that the difference between the first average value and the second average value is less than the second predetermined threshold, step S225 is performed; otherwise, step S226 is performed.

Step S225: Determine the current seed sample as the target seed sample if the difference is less than the second predetermined threshold.

When the difference between the first average value and the second average value is less than the second predetermined threshold, the iterative process is terminated, and the determined current seed sample is the target seed sample. After the target seed sample is determined, step S24 and step S26 shown in FIG. 2A may be performed by using the target seed sample, to achieve an objective of cleansing the voice data by filtering the voice samples according to the cosine distances.

Step S226: Use the current seed sample as the seed sample in the last round, select a voice sample from the current remaining voice samples, splice the selected voice sample into the current seed sample, and use the current remaining voice samples as the remaining voice samples in the last round if the difference is greater than or equal to the second predetermined threshold, and go back to step S223.

When the difference between the first average value and the second average value is greater than or equal to the second predetermined threshold, then further iteration is performed, and the current seed sample is used as the seed sample in the last round, the voice sample is selected from the current remaining voice samples, the selected voice sample is spliced into the current seed sample, the current remaining voice samples are used as the remaining voice samples in the last round, and continue to go back to step S223, to continue to a next iterative process. The iterative process is not terminated until it is determined that a difference between two calculated average values of cosine distances is less than a second predetermined threshold.

In the foregoing steps, the target seed sample is determined in the multiple voice samples by means of the iterative process, and in the iterative process, clustering is performed according to cosine distances between I-Vector vectors, so that an objective of performing differential clustering on the multiple voice samples is achieved.

Figure 4B:
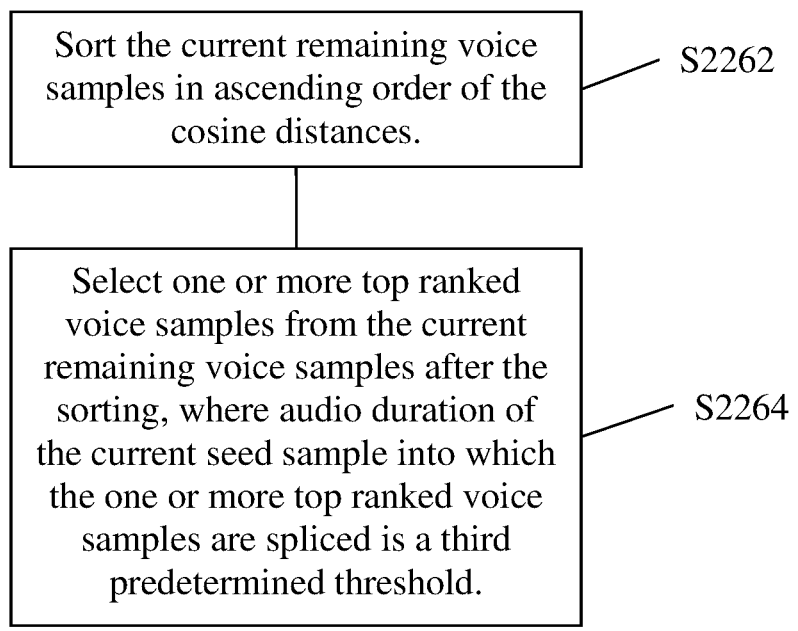

As shown in FIG. 4B, Step S226 of selecting a voice sample from the current remaining voice samples may include the following steps:

Step S2262: Sort the current remaining voice samples in ascending order of the cosine distances.

Step S2264: Select one or more top ranked voice samples from the current remaining voice samples after the sorting, where audio duration of the current seed sample into which the one or more top ranked voice samples are spliced is a third predetermined threshold.

It should be noted that, after the cosine distance between the I-Vector vector of the current seed sample and the I-Vector vector of each of the current remaining voice samples is calculated, when a condition for terminating the iterative process is not satisfied, a current seed sample is re-determined. When the current seed sample is determined, the cosine distances may be sorted in ascending order first. An objective of the sorting is to conveniently and rapidly determine at least one voice sample with a relatively short cosine distance, so that the voice sample with the relatively short cosine distance is spliced into the current seed sample.

It should be further noted that, when the at least one voice sample with the relatively short cosine distance is spliced into the current seed sample, audio duration of a seed sample determined according to an actual requirement is considered, and a quantity of voice samples that are to be spliced into the current seed sample is determined according to the audio duration. Herein, a reference value of the audio duration of the current seed sample is the third predetermined threshold. The third predetermined threshold may be set or adjusted according to an actual requirement, and is not specifically limited herein.

In a technical solution provided in step S24, after the target seed sample is determined, the voice sample other than the target seed sample in the multiple voice samples is the target remaining voice sample. There may be one or more target remaining voice samples. It should be noted that, a method for calculating the cosine distance between the I-Vector vector of the target seed sample and the I-Vector vector of each of the target remaining voice samples is the same as the method described in step S223, and details are not described herein again. When there are multiple target remaining voice samples, there are multiple calculated cosine distances between the I-Vector vector of the target seed sample and the I-Vector vectors of the target remaining voice samples. The cosine distances are all within a range of negative one (−1) to positive one (+1), and at least two cosine distances may be the same.

In a technical solution provided in step S26, the target voice sample may be obtained according to the cosine distance calculated in step S24. The target voice sample is a voice sample obtained by means of filtering from the multiple voice samples or the target remaining voice sample. It should be noted that, a condition for filtering the multiple voice samples or the target remaining voice sample is that the cosine distance between the I-Vector vector of the target voice sample and the I-Vector vector of the target seed sample is higher than the first predetermined threshold. The first predetermined threshold may be set or adjusted according to an actual requirement, and is not specifically limited herein. There may be one or more target voice samples that are obtained by means of filtering from the multiple voice samples or the target remaining voice sample according to the filtering condition.

In an actual application scenario, the target voice sample obtained by means of the foregoing steps is a voice sample of a voiceprint of a particular person that is obtained by cleansing voice data including the voiceprint of the particular person, a voiceprint of another person, and noise. By means of the foregoing steps, a technical problem in the related technology that voice data cannot be adequately cleansed by using a manual marking method, leading to low voice data cleansing efficiency, may be resolved, thereby achieving a technical effect of improving the voice data cleansing efficiency.

Figure 2E:
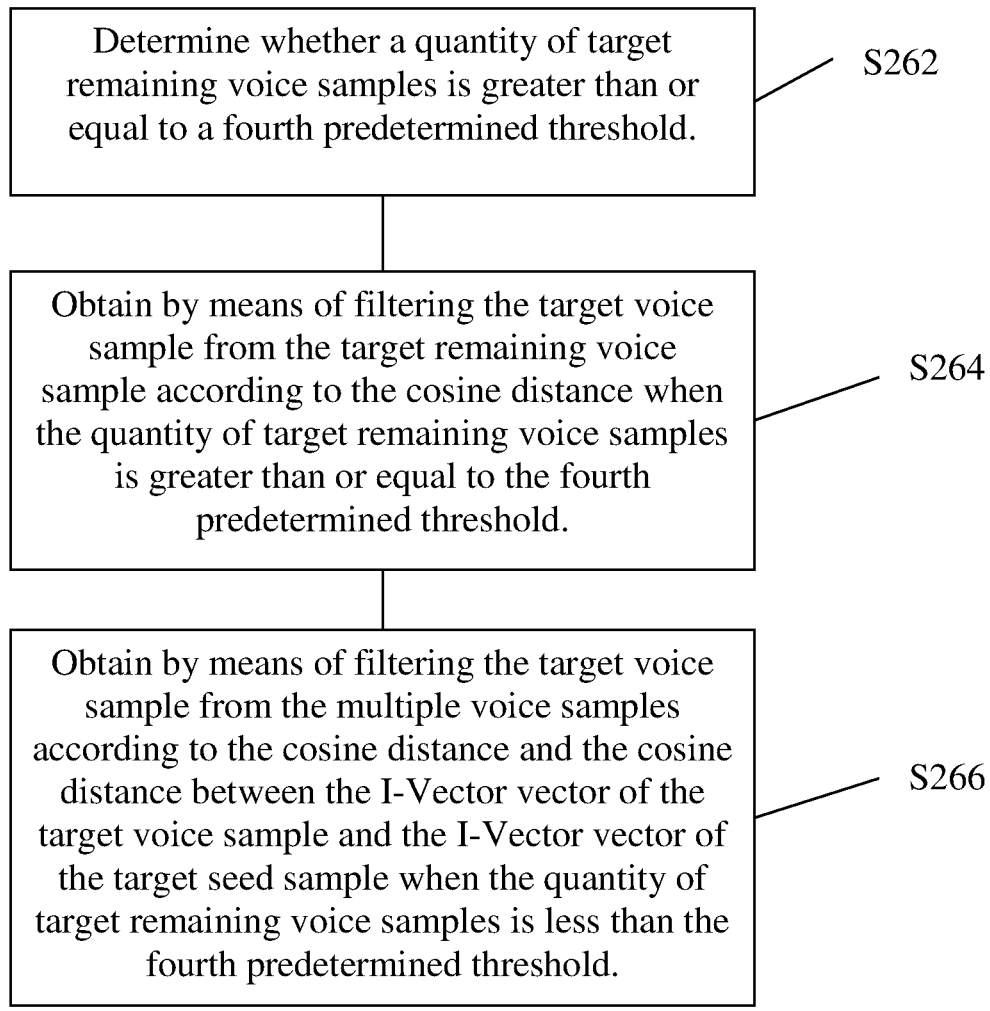

As shown in FIG. 2E, Step S26 of obtaining by means of filtering a target voice sample from the multiple voice samples or the target remaining voice sample at least according to the cosine distance may include the following steps:

Step S262: Determine whether a quantity of target remaining voice samples is greater than or equal to a fourth predetermined threshold.

Step S264: Obtain by means of filtering the target voice sample from the target remaining voice sample according to the cosine distance when the quantity of target remaining voice samples is greater than or equal to the fourth predetermined threshold.

Step S266: Obtain by means of filtering the target voice sample from the multiple voice samples according to the cosine distance and the cosine distance between the I-Vector vector of the target voice sample and the I-Vector vector of the target seed sample when the quantity of target remaining voice samples is less than the fourth predetermined threshold.

It should be noted that, the target voice sample obtained in step S26 may be obtained by means of filtering from the multiple voice samples, or may be obtained by means of filtering from the target remaining voice sample. In this exemplary embodiment, a quantity of target remaining voice samples is used as a basis for determining whether filtering is performed on the multiple voice samples or whether filtering is performed on the target remaining voice samples. Specifically, when the quantity of target remaining voice samples is greater than or equal to the fourth predetermined threshold, the target voice sample may be obtained by means of filtering from the target remaining voice samples according to the cosine distance between the I-Vector vector of the target seed sample and the I-Vector vector of the target remaining voice sample, and a voice sample having a cosine distance higher than the first predetermined threshold is selected from the target remaining voice sample, as the target voice sample. When the quantity of target remaining voice samples is less than the fourth predetermined threshold, the target voice sample may be obtained by means of filtering from the multiple voice samples according to the cosine distance between the I-Vector vector of the target seed sample and the I-Vector vector of the target remaining voice sample and the cosine distance between the I-Vector vector of the target voice sample and the I-Vector vector of the target seed sample. Herein, the cosine distance between the I-Vector vector of the target voice sample and the I-Vector vector of the target seed sample are considered at the same time, and a voice sample having a cosine distance higher than the first predetermined threshold is selected from the multiple voice samples, as the target voice sample.

In this exemplary embodiment, it is determined, according to the quantity of target remaining voice samples, whether the target voice sample is obtained by means of filtering from the multiple voice samples or the target voice sample is obtained by means of filtering from the target remaining voice sample, so that it may be ensured that when there is a small quantity of target remaining voice samples, the target voice sample may be accurately obtained by means of filtering, thereby achieving an effect of improving accuracy of obtaining a required voice sample required after voice data is cleansed.

Figure 5:
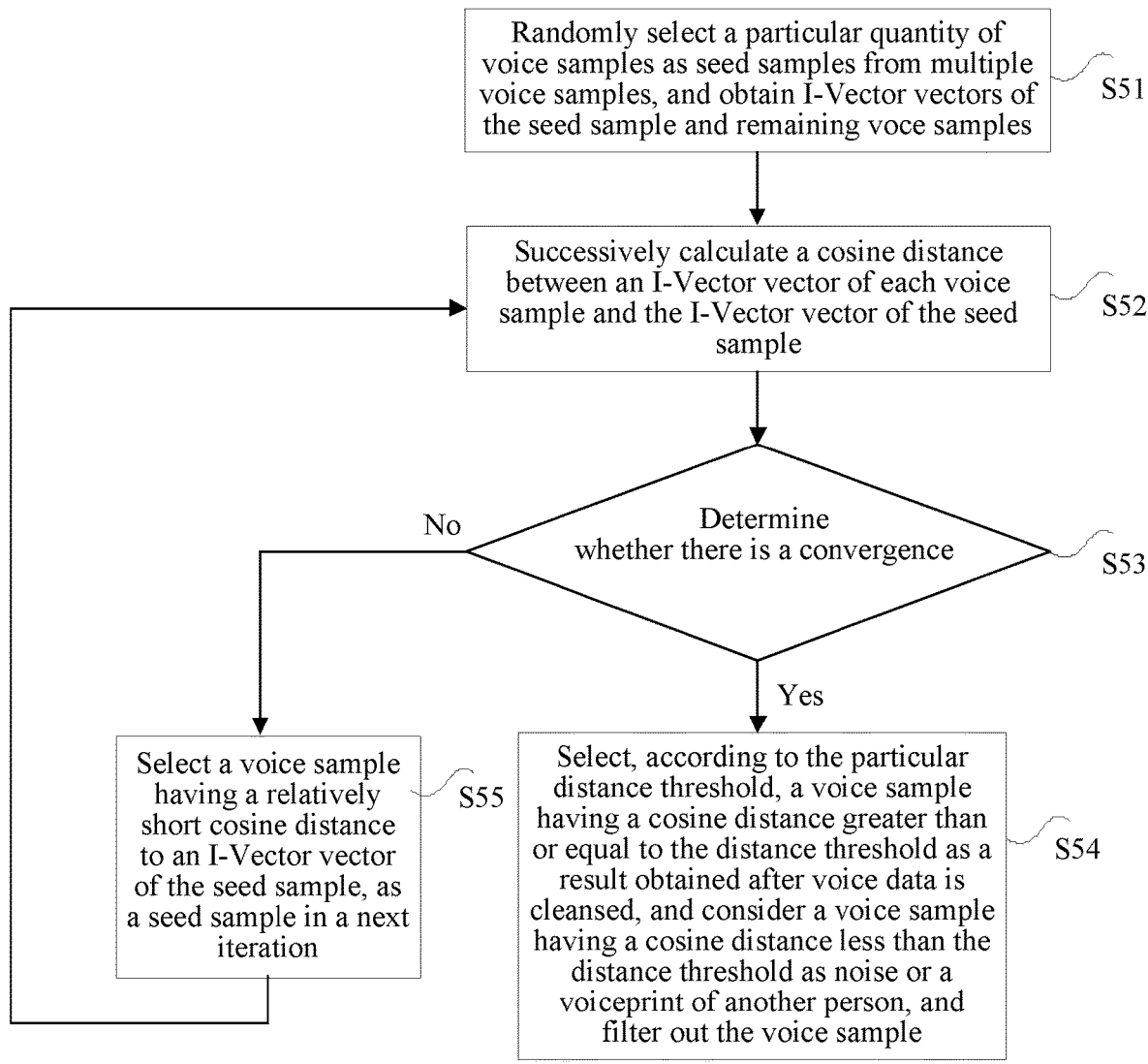
FIG. 5 is a flowchart of a voice data processing method according to an exemplary embodiment.

FIG. 5 is a flowchart of a voice data processing method according to an exemplary embodiment. As show in FIG. 5, this exemplary embodiment may include the following steps:

Step S51: Randomly select a particular quantity of voice samples as seed samples from multiple voice samples, and obtain I-Vector vectors of the seed sample and remaining voice samples.

Step S52: Successively calculate a cosine distance between an I-Vector vector of each voice sample and the I-Vector vector of the seed sample.

Step S53: Determine whether there is a convergence, that is, determine whether a difference between an average value of cosine distances between an I-Vector vector of a current seed sample and I-Vector vectors of current remaining voice samples and an average value of cosine distances calculated in a last round is less than a particular threshold, and if yes, perform step S54; otherwise, perform step S55.

Step S54: Select, according to the particular distance threshold, a voice sample having a cosine distance greater than or equal to the distance threshold as a result obtained after voice data is cleansed, and consider a voice sample having a cosine distance less than the distance threshold as noise or a voiceprint of another person, and filter out the voice sample. At this point, cleansing of the voice data is terminated.

Step S55: Select a voice sample having a relatively short cosine distance to an I-Vector vector of the seed sample, as a seed sample in a next iteration, and go back to step S52.

Descriptions are Provided by Using an Example:

It is assumed that there are 100 voice samples in total in a target folder, and 60 voice samples belong to a person A, and remaining voice samples are samples of another person or various types of noise. Audio data of five minutes is randomly selected from the 100 voice samples. When selection is performed the first time, a file having duration as short as possible is selected, and as many voice samples as possible are included. According to probability distribution, most of voice samples selected in such a manner are samples belonging to A. The selected voice samples are spliced. If duration exceeds five minutes, data of five minutes is captured by using ffmpeg, as a seed sample. An I-Vector vector of the seed sample is extracted as a feature of the seed sample.

If 10 voice samples are selected as seed samples in a current round, I-Vector vectors of the remaining 90 voice samples are respectively extracted; then a cosine distance between the I-Vector vector and the I-Vector vector of the seed sample is calculated. Next, an average value of the cosine distances of the 90 voice samples is obtained and denoted as score_itN, where N is a quantity of iterations.

If an absolute value of score_itN-score_it (N−1) is less than a threshold (the threshold is usually obtained by means of statistics collection; however this is only an example of obtaining the threshold), the iteration is stopped, and a next step is performed. Otherwise, a voice sample with a highest score, that is, a voice sample having a relatively short cosine distance to the seed sample is selected and spliced into an audio of five minutes, as the seed sample in the next iteration, and then, the next iteration is performed.

According to a particular distance threshold Th (the distance threshold Th is obtained by experience), only a voice sample having a distance greater than Th is used as a result obtained after voice data is cleansed, and a voice sample having a distance lower than Th may be considered as noise or a sample of another person. At this point, automatic cleansing is terminated.

In the voice data processing method in this exemplary embodiment, an automatic clustering method based on a cosine distance between I-Vector vectors is used for automatic voice data cleansing. However, during specific implementation, only a particular category in which most samples are included is concerned about instead of concerning about how many categories may be finally obtained after clustering, and another category in which a relatively small quantity of samples are included may be considered as noise or samples of another person, and discarded. The exemplary embodiments described above may greatly reduce labor costs, and provide a possibility for generating mass voice data of high quality. According to the exemplary embodiments, a result is provided finally by using a cosine distance between samples, which is flexible. A final distance threshold for filtering may be flexibly selected according to an actual requirement, and a balance between quality of a sample and a quantity of samples is achieved. According to the exemplary embodiments, training of the UBM and the GMM and the I-Vector matrix is very time-consuming. Except for that the training, calculation speeds in other steps are very high, and the UBM and the GMM and the I-Vector matrix need to be trained only once.

It should be noted that, for brief description, the foregoing method exemplary embodiments are represented as a series of action combinations. However, a person skilled in the art should appreciate that the exemplary embodiments are not limited to the described order of the actions, because according to the exemplary embodiments, some steps may be performed in other orders or performed at the same time. In addition, a person skilled in the art should also know that the related actions and modules in the exemplary embodiments described in the specification are not necessarily mandatory to the exemplary embodiments.

By means of the foregoing descriptions of the exemplary embodiments, a person skilled in the art may clearly understand that the method according to the foregoing exemplary embodiments may be implemented by software in addition to a hardware platform and certainly may also be implemented by hardware. Based on such an understanding, the technical solutions of the exemplary embodiments essentially or the part contributing to the existing technology may be implemented in a form of a software product. The computer software product is stored in a storage medium (such as a read-only medium (ROM)/a random access memory (RAM), a magnetic disk or an optical disc) and includes several instructions for instructing a terminal device (which may be a mobile phone, a computer, a server, a network device, or the like) to perform the methods described in the exemplary embodiments.

Figure 6:
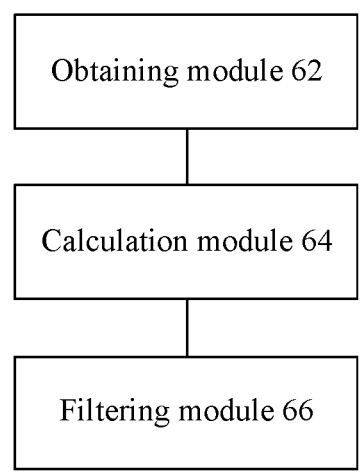
FIG. 6 is a schematic diagram of a voice data processing apparatus according to an exemplary embodiment.

According to the exemplary embodiments, a voice data processing apparatus configured to implement the voice data processing method is further provided. FIG. 6 is a schematic diagram of a voice data processing apparatus according to an exemplary embodiment. As shown in FIG. 6, the apparatus may include:

an obtaining module 62, configured to: obtain an I-Vector vector of each of multiple voice samples, and determine a target seed sample in the multiple voice samples; a calculation module 64, configured to respectively calculate a cosine distance between an I-Vector vector of the target seed sample and an I-Vector vector of a target remaining voice sample, the target remaining voice sample being a voice sample other than the target seed sample in the multiple voice samples; and a filtering module 66, configured to obtain by means of filtering a target voice sample from the multiple voice samples or the target remaining voice sample at least according to the cosine distance, a cosine distance between an I-Vector vector of the target voice sample and the I-Vector vector of the target seed sample being higher than a first predetermined threshold.

It should be noted that the obtaining module 62 in this exemplary embodiment may be configured to perform step S22 according to the above exemplary embodiments; the calculation module 64 in this exemplary embodiment may be configured to perform step S24 according to the above exemplary embodiments; and the filtering module 66 in this exemplary embodiment may be configured to perform step S26 according to the above exemplary embodiments.

Herein, it should be noted that, examples implemented by the foregoing modules and corresponding steps and application scenarios thereof are the same, but are not limited to the content disclosed in the foregoing exemplary embodiments. It should be noted that, the foregoing modules as a part of the apparatus may be run in the hardware environment shown in FIG. 1, and may be implemented by software or may be implemented by hardware.

A technical problem in the related technology that voice data cannot be adequately cleansed by using a manual marking method, leading to low voice data cleansing efficiency, may be resolved by using the foregoing modules, thereby achieving a technical effect of improving the voice data cleansing efficiency.

Figure 7:
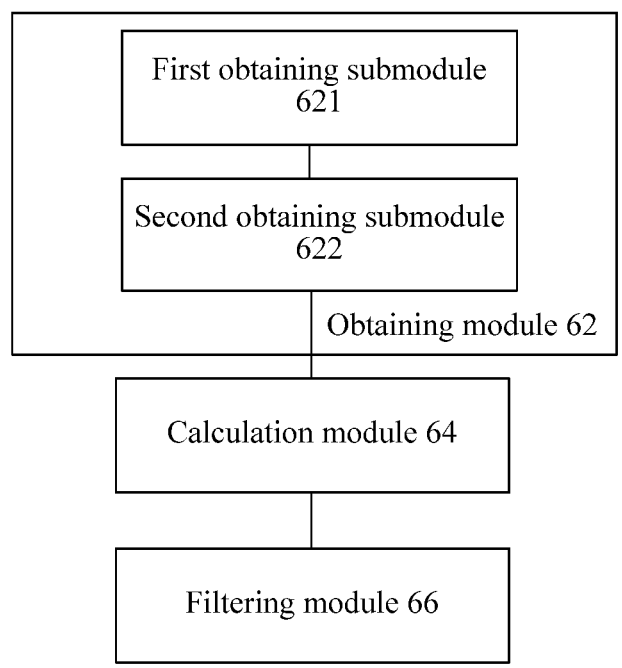
FIG. 7 is a schematic diagram of a voice data processing apparatus according to an exemplary embodiment.

FIG. 7 is a schematic diagram of another voice data processing apparatus according to an exemplary embodiment. As shown in FIG. 7, the obtaining module 62 may include: a first obtaining submodule 621, configured to obtain a voice feature parameter of each of the multiple voice samples; and a second obtaining submodule 622, configured to obtain the I-Vector vector of each voice sample by using an I-Vector matrix completed by means of pre-training, where the I-Vector matrix is used to indicate the I-Vector vector corresponding to the voice feature parameter of the voice sample.

It should be noted that, the first obtaining submodule 621 in this exemplary embodiment may be configured to perform step S221 according to the above exemplary embodiments; and the second obtaining submodule 622 in this exemplary embodiment may be configured to perform step S222 according to the above exemplary embodiments. Herein, it should be noted that, examples implemented by the foregoing modules and corresponding steps and application scenarios thereof are the same, but are not limited to the content disclosed in the foregoing exemplary embodiments. It should be noted that, the foregoing modules as a part of the apparatus may be run in the hardware environment shown in FIG. 1, and may be implemented by software or may be implemented by hardware.

Figure 8:
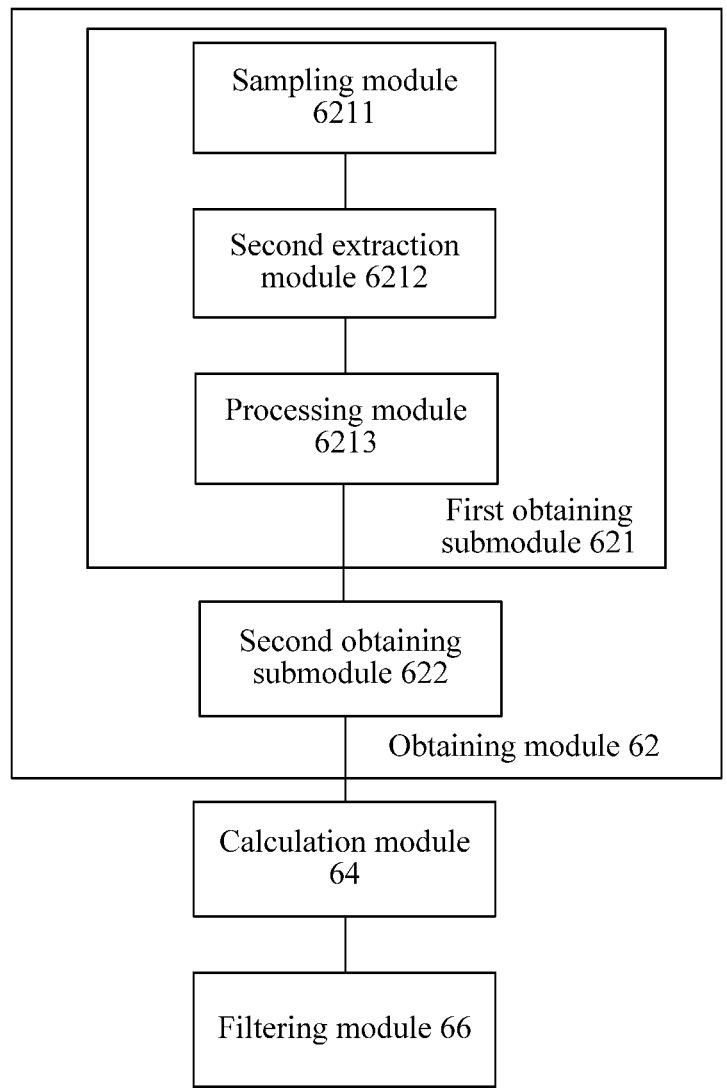
FIG. 8 is a schematic diagram of another voice data processing apparatus according to an exemplary embodiment.

FIG. 8 is a schematic diagram of another voice data processing apparatus according to an exemplary embodiment. As shown in FIG. 8, the first obtaining submodule 621 may include: a sampling module 6211, configured to process the voice samples into PCM signals whose sampling rates are respectively a first sampling rate and a second sampling rate; a second extraction module 6212, configured to extract the voice feature parameters from the PCM signals; and a processing module 6213, configured to perform energy detection and normalization processing on the voice feature parameters.

It should be noted that, the sampling module 6211 in this exemplary embodiment may be configured to perform step S2211 according to the above exemplary embodiments; the second extraction module 6212 in this exemplary embodiment may be configured to perform step S2212 according to the above exemplary embodiments; and the processing module 6213 in this exemplary embodiment may be configured to perform step S2213 according to the above exemplary embodiments. Herein, it should be noted that, examples implemented by the foregoing modules and corresponding steps and application scenarios thereof are the same, but are not limited to the content disclosed in the foregoing exemplary embodiments. It should be noted that, the foregoing modules as a part of the apparatus may be run in the hardware environment shown in FIG. 1, and may be implemented by software or may be implemented by hardware.

Figure 9:
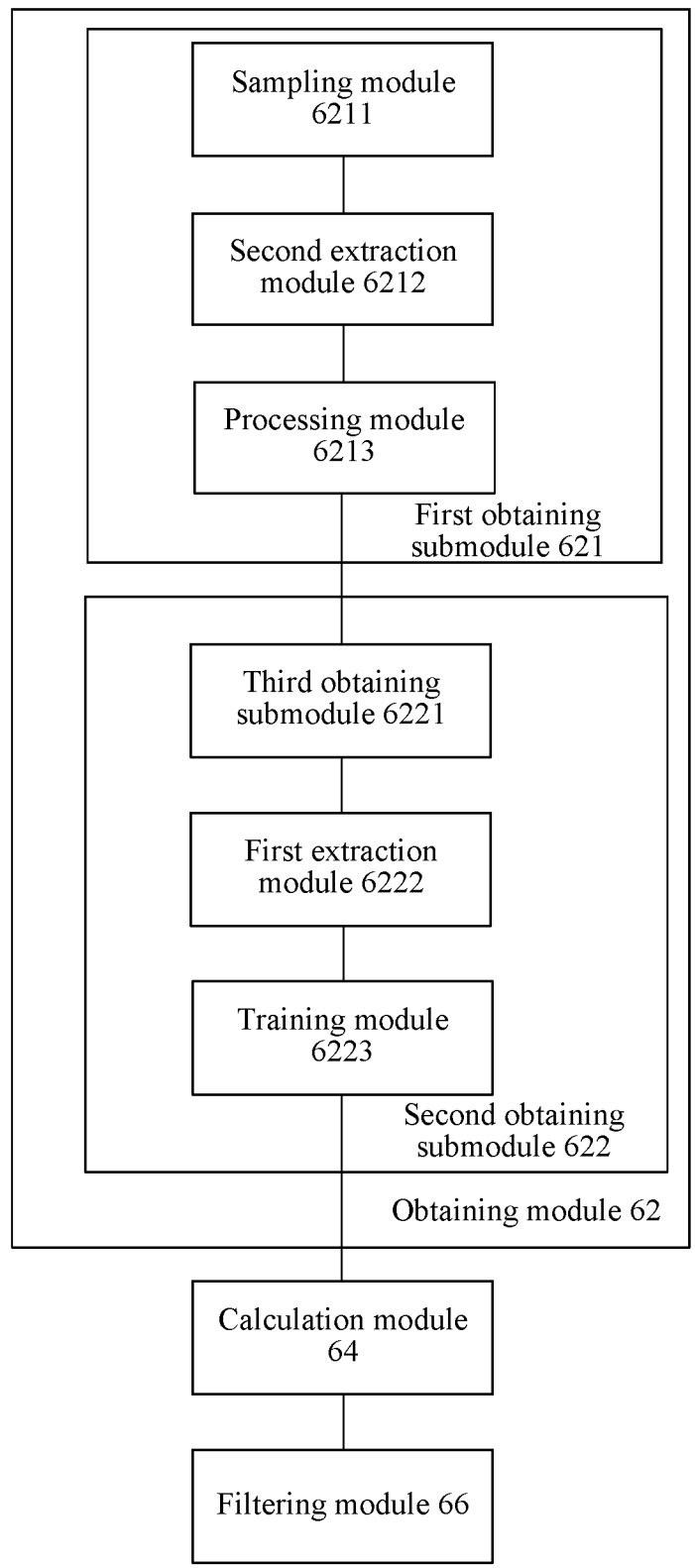
FIG. 9 is a schematic diagram of another voice data processing apparatus according to an exemplary embodiment.

FIG. 9 is a schematic diagram of another voice data processing apparatus according to an exemplary embodiment. As shown in FIG. 9, the I-Vector matrix is obtained by means of training by using the following modules: a third obtaining submodule 6221, configured to obtain a voice feature parameter of each of multiple voice samples used to train the I-Vector matrix; a first extraction module 6222, configured to extract, according to the voice feature parameter of each of the multiple voice samples used to train the I-Vector matrix, a GSV from a GMM completed by means of pre-training, where the GMM is a model obtained by means of training by using a voice feature parameter of each of multiple voice samples used to train the GMM; and a training module 6223, configured to train the I-Vector matrix by using the GSV.

It should be noted that, the third obtaining submodule 6221 in this exemplary embodiment may be configured to perform step S2221 according to the above exemplary embodiments; the first extraction module 6222 in this exemplary embodiment may be configured to perform step S2222 according to the above exemplary embodiments; and the training module 6223 in this exemplary embodiment may be configured to perform step S2223 according to the above exemplary embodiments. Herein, it should be noted that, examples implemented by the foregoing modules and corresponding steps and application scenarios thereof are the same, but are not limited to the content disclosed in the foregoing exemplary embodiments. It should be noted that, the foregoing modules as a part of the apparatus may be run in the hardware environment shown in FIG. 1, and may be implemented by software or may be implemented by hardware.

Figure 10:
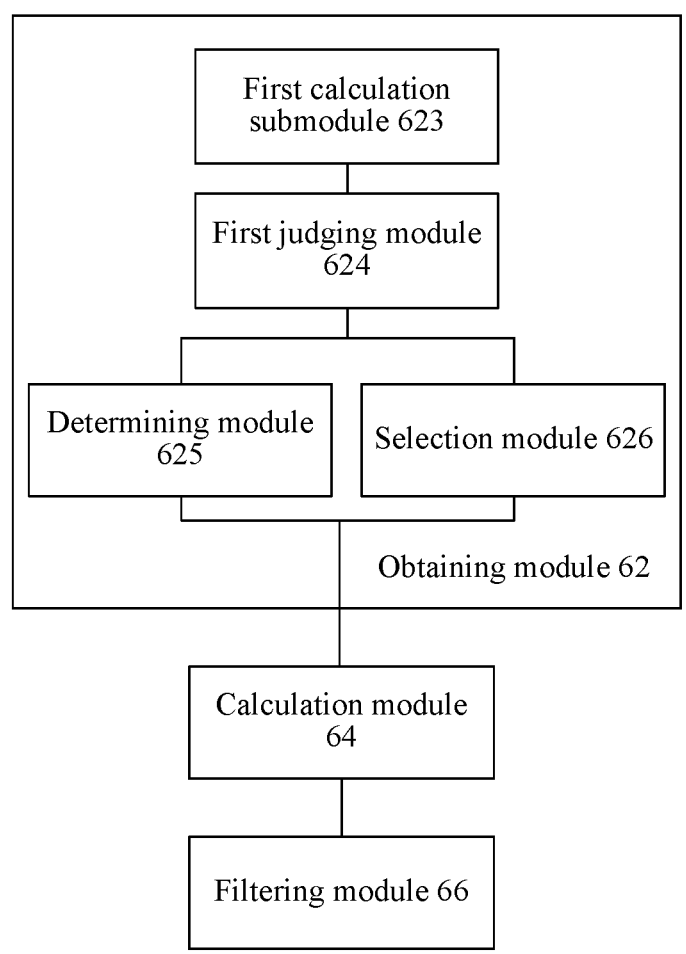
FIG. 10 is a schematic diagram of another voice data processing apparatus according to an exemplary embodiment.

FIG. 10 is a schematic diagram of another voice data processing apparatus according to an exemplary embodiment. As shown in FIG. 10, a current seed sample is initialized as being obtained by splicing at least one of the multiple voice samples; a seed sample in a last round and remaining voice samples in the last round are initialized as empty; and the obtaining module 62 may include: repeatedly performing operations in the following modules, until the target seed sample is determined: a first calculation submodule 623, configured to respectively calculate cosine distances between an I-Vector vector of the current seed sample and I-Vector vectors of current remaining voice samples, where the current remaining voice samples are voice samples other than the current seed sample in the multiple voice samples; a first judging module 624, configured to determine whether a difference between a first average value and a second average value is less than a second predetermined threshold, where the first average value is an average value of the cosine distances between the I-Vector vector of the current seed sample and the I-Vector vectors of the current remaining voice samples; the second average value is an average value of cosine distances between an I-Vector vector of the seed sample in the last round and I-Vector vectors of the remaining voice samples in the last round; and the remaining voice samples in the last round are voice samples other than the seed sample in the last round in the multiple voice samples; a determining module 625, configured to determine the current seed sample as the target seed sample if the difference is less than the second predetermined threshold; and a selection module 626, configured to: use the current seed sample as the seed sample in the last round, select a voice sample from the current remaining voice samples, splice the selected voice sample into the current seed sample, and use the current remaining voice samples as the remaining voice samples in the last round if the difference is greater than or equal to the second predetermined threshold.

It should be noted that, the first calculation submodule 623 in this exemplary embodiment may be configured to perform step S223 according to the above exemplary embodiments; the first judging module 624 in this exemplary embodiment may be configured to perform step S224 according to the above exemplary embodiments; the determining module 625 in this exemplary embodiment may be configured to perform step S225 according to the above exemplary embodiments; and the selection module 626 in this exemplary embodiment may be configured to perform step S226 according to the above exemplary embodiments. Herein, it should be noted that, examples implemented by the foregoing modules and corresponding steps and application scenarios thereof are the same, but are not limited to the content disclosed in the foregoing exemplary embodiments. It should be noted that, the foregoing modules as a part of the apparatus may be run in the hardware environment shown in FIG. 1, and may be implemented by software or may be implemented by hardware.

Figure 11:
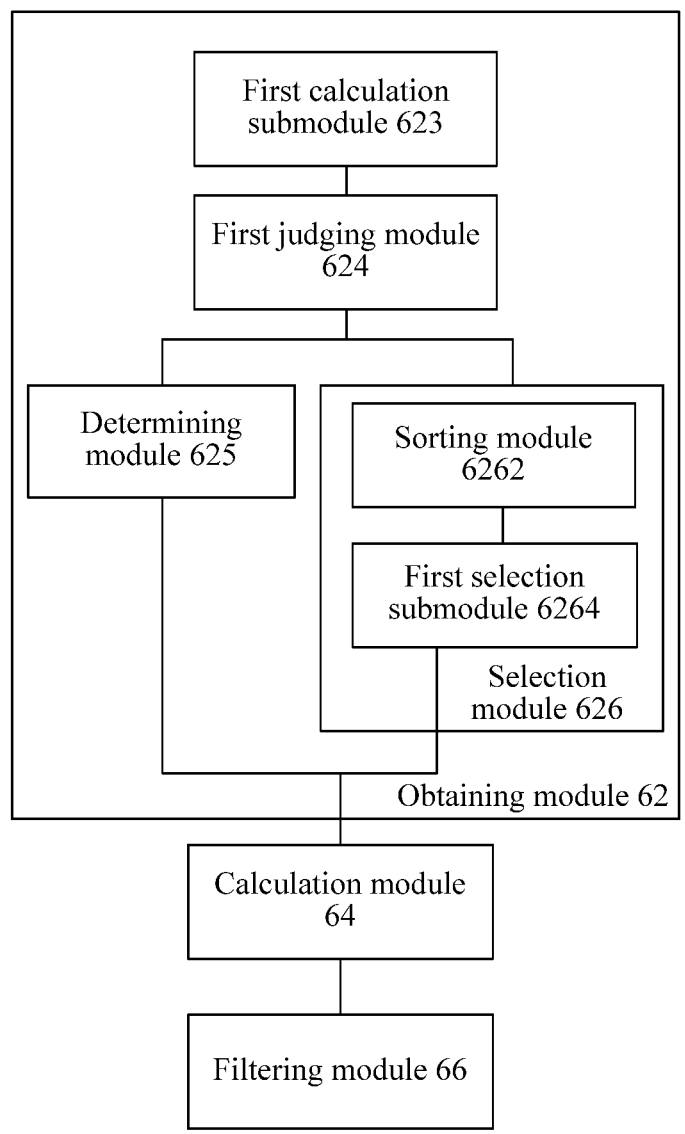
FIG. 11 is a schematic diagram of another voice data processing apparatus according to an exemplary embodiment.

FIG. 11 is a schematic diagram of another voice data processing apparatus according to an exemplary embodiment. As shown in FIG. 11, the selection module 626 may include: a sorting module 6262, configured to sort the current remaining voice samples in ascending order of the cosine distances; and a first selection submodule 6264, configured to select one or more top ranked voice samples from the current remaining voice samples after the sorting, where audio duration of the current seed sample into which the one or more top ranked voice samples are spliced is a third predetermined threshold.

It should be noted that, the sorting module 6262 in this exemplary embodiment may be configured to perform step S2262 according to the above exemplary embodiments; and the first selection submodule 6264 in this exemplary embodiment may be configured to perform step S2264 according to the above exemplary embodiments. Herein, it should be noted that, examples implemented by the foregoing modules and corresponding steps and application scenarios thereof are the same, but are not limited to the content disclosed in the foregoing exemplary embodiments. It should be noted that, the foregoing modules as a part of the apparatus may be run in the hardware environment shown in FIG. 1, and may be implemented by software or may be implemented by hardware.

Figure 12:
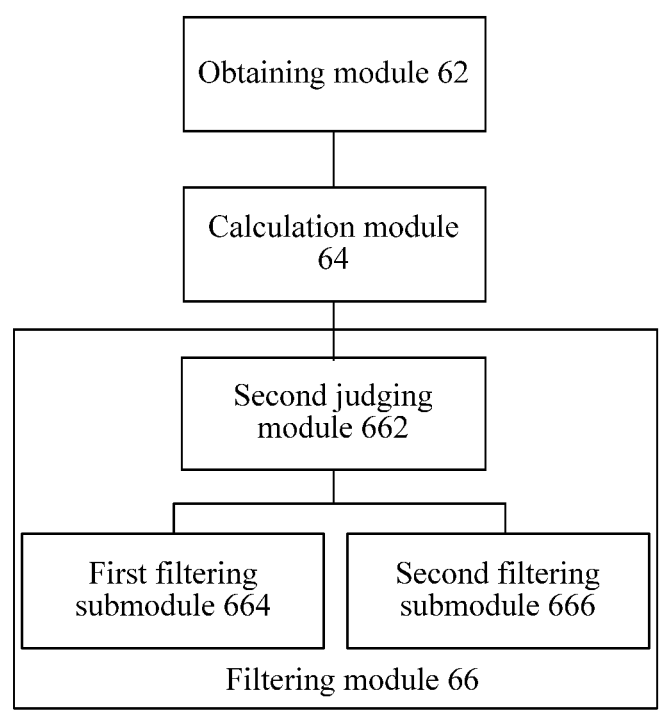
FIG. 12 is a schematic diagram of another voice data processing apparatus according to an exemplary embodiment.

FIG. 12 is a schematic diagram of another voice data processing apparatus according to an exemplary embodiment. As shown in FIG. 12, the filtering module 66 may include: a second judging module 662, configure to determine whether a quantity of target remaining voice samples is greater than or equal to a fourth predetermined threshold; a first filtering submodule 664, configured to obtain by means of filtering the target voice sample from the target remaining voice sample according to the cosine distance when the quantity of target remaining voice samples is greater than or equal to the fourth predetermined threshold; and a second filtering submodule 666, configured to obtain by means of filtering the target voice sample from the multiple voice samples according to the cosine distance and the cosine distance between the I-Vector vector of the target voice sample and the I-Vector vector of the target seed sample when the quantity of target remaining voice samples is less than the fourth predetermined threshold.

It should be noted that, the first filtering submodule 664 in this exemplary embodiment may be configured to perform step S262 according to the above exemplary embodiments; the first filtering submodule 664 in this exemplary embodiment may be configured to perform step S262 according to the above exemplary embodiments; and the second filtering submodule 666 in this exemplary embodiment may be configured to perform step S262 according to the above exemplary embodiments. Herein, it should be noted that, examples implemented by the foregoing modules and corresponding steps and application scenarios thereof are the same, but are not limited to the content disclosed in the foregoing exemplary embodiments. It should be noted that, the foregoing modules as a part of the apparatus may be run in the hardware environment shown in FIG. 1, and may be implemented by software or may be implemented by hardware.

According to the exemplary embodiments, a server or a terminal configured to implement the voice data processing method is further provided.

Figure 13:
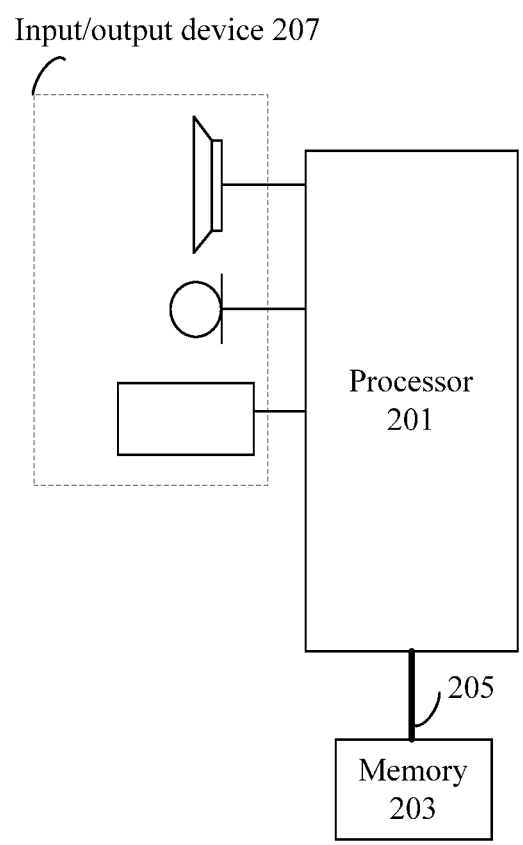
FIG. 13 is a structural block diagram of a terminal according to an exemplary embodiment.

FIG. 13 is structural block diagram of a terminal according to an exemplary embodiment. As shown in FIG. 13, the terminal may include: one or more (only one is shown in the figure) processors 201, one or more (only one is shown in the figure) memories 203, and a transmission apparatus 205 (for example, a sending apparatus in the foregoing exemplary embodiments), and as shown in FIG. 13, the terminal may further include an input/output device 207.

The memory 203 may be configured to store a software program and module, for example, a program instruction/module corresponding to the voice data processing method and apparatus in the exemplary embodiments. The processor 201 performs various functional applications and data processing by running the software program and module stored in the memory 203, that is, implements the foregoing voice data processing method. The memory 203 may include a high-speed RAM, and may also include a non-volatile memory such as one or more magnetic storage apparatuses, a flash memory, or another non-volatile solid-state memory. In some embodiments, the memory 203 may further include memories remotely disposed relative to the processor 201, and these remote memories may be connected to the terminal by using a network. Examples of the network include, but are not limited to, the Internet, an intranet, a local area network, a mobile communications network, and a combination thereof.

The transmission apparatus 205 is configured to receive or send data by using a network, and may be further configured to transmit data between the processor and the memory. Specific examples of the foregoing network may include a wired network and a wireless network. In an example, the transmission apparatus 205 includes a network interface controller (NIC) that may be connected to another network device and a router by using a network cable, thereby communicating with the Internet or a local area network. In an example, the transmission apparatus 205 is a radio frequency (RF) module that is configured to communicate with the Internet in a wireless manner.

Specifically, the memory 203 is configured to store an application program.

The processor 201 may invoke, by using the transmission apparatus 205, the application program stored in the memory 203 to perform the following steps: obtaining an I-Vector vector of each of multiple voice samples, and determining a target seed sample in the multiple voice samples; respectively calculating a cosine distance between an I-Vector vector of the target seed sample and an I-Vector vector of a target remaining voice sample, the target remaining voice sample being a voice sample other than the target seed sample in the multiple voice samples; and obtaining by means of filtering a target voice sample from the multiple voice samples or the target remaining voice sample at least according to the cosine distance, a cosine distance between an I-Vector vector of the target voice sample and the I-Vector vector of the target seed sample being higher than a first predetermined threshold.

The processor 201 is further configured to perform the following step: repeatedly performing the following operations, until the target seed sample is determined: respectively calculating cosine distances between an I-Vector vector of the current seed sample and I-Vector vectors of current remaining voice samples, where the current remaining voice samples are voice samples other than the current seed sample in the multiple voice samples; determining whether a difference between a first average value and a second average value is less than a second predetermined threshold, where the first average value is an average value of the cosine distances between the I-Vector vector of the current seed sample and the I-Vector vectors of the current remaining voice samples; the second average value is an average value of cosine distances between an I-Vector vector of the seed sample in the last round and I-Vector vectors of the remaining voice samples in the last round; and the remaining voice samples in the last round are voice samples other than the seed sample in the last round in the multiple voice samples; and determining the current seed sample as the target seed sample if the difference is less than the second predetermined threshold; or using the current seed sample as the seed sample in the last round, selecting a voice sample from the current remaining voice samples, splicing the selected voice sample into the current seed sample, and using the current remaining voice samples as the remaining voice samples in the last round if the difference is greater than or equal to the second predetermined threshold.

The processor 201 is further configured to perform the following steps: sorting the current remaining voice samples in ascending order of the cosine distances; and selecting one or more top ranked voice samples from the current remaining voice samples after the sorting, where audio duration of the current seed sample into which the one or more top ranked voice samples are spliced is a third predetermined threshold.

The processor 201 is further configured to perform the following steps: determining whether a quantity of target remaining voice samples is greater than or equal to a fourth predetermined threshold; and obtaining by means of filtering the target voice sample from the target remaining voice sample according to the cosine distance when the quantity of target remaining voice samples is greater than or equal to the fourth predetermined threshold; or obtaining by means of filtering the target voice sample from the multiple voice samples according to the cosine distance and the cosine distance between the I-Vector vector of the target voice sample and the I-Vector vector of the target seed sample when the quantity of target remaining voice samples is less than the fourth predetermined threshold.

The processor 201 is further configured to perform the following steps: obtaining a voice feature parameter of each of the multiple voice samples; and obtaining the I-Vector vector of each voice sample by using an I-Vector matrix completed by means of pre-training, where the I-Vector matrix is used to indicate the I-Vector vector corresponding to the voice feature parameter of the voice sample.

The processor 201 is further configured to perform the following steps: obtaining a voice feature parameter of each of multiple voice samples used to train the I-Vector matrix; extracting, according to the voice feature parameter of each of the multiple voice samples used to train the I-Vector matrix, a GSV from a GMM completed by means of pre-training, where the GMM is a model obtained by means of training by using a voice feature parameter of each of multiple voice samples used to train the GMM; and training the I-Vector matrix by using the GSV.

The processor 201 is further configured to perform the following steps: processing the voice samples into PCM signals whose sampling rates are respectively a first sampling rate and a second sampling rate; extracting the voice feature parameters from the PCM signals; and performing energy detection and normalization processing on the voice feature parameters.

According to the above-described exemplary embodiments, an automatic voice data cleansing solution is provided. An I-Vector vector of each voice sample is obtained, and a target seed sample is determined in the voice samples; a cosine distance between an I-Vector vector of the target seed sample and an I-Vector vector of a target remaining voice sample is respectively calculated; and a target voice sample whose cosine distance to the I-Vector vector of the target seed sample is higher than a first predetermined threshold is obtained by means of filtering from multiple voice samples or the target remaining voice sample at least according to the cosine distance, to achieve an objective of automatically cleansing voice data without human intervention, thereby resolving a technical problem in the related technology that voice data cannot be adequately cleansed by using a manual marking method, leading to low voice data cleansing efficiency, and achieving a technical effect of improving the voice data cleansing efficiency.

For a specific example in this exemplary embodiment, refer to examples described in the foregoing exemplary embodiments, and details are not described again.

A person of ordinary skill in the art may understand that, the structure shown in FIG. 13 is only an example. The terminal may be a terminal device such as a smartphone (such as an Android mobile phone or an iOS mobile phone), a tablet computer, a palmtop computer, a mobile Internet device (MID), or a PAD. FIG. 13 does not limit the structure of the foregoing electronic apparatus. For example, the terminal may further include more or less components (such as a network interface and a display apparatus) than those shown in FIG. 13, or has a configuration different from that shown in FIG. 13.

A person of ordinary skill in the art may understand that all or some of the steps of the methods in the above-described exemplary embodiments may be implemented by a program instructing related hardware of a terminal device. The program may be stored in a computer-readable storage medium. The storage medium may include a flash memory, a ROM, a RAM, a magnetic disk, or an optical disc.

An exemplary embodiment further provides a storage medium. In this exemplary embodiment, the storage medium may be configured to execute program code of the voice data processing method.

In this exemplary embodiment, the storage medium may be located in at least one of multiple network devices in the network shown in the foregoing embodiment.

In this exemplary embodiment, the storage medium is configured to store program code used to perform the following steps (the steps may correspond to the Steps S22-S26 described above with respect to FIG. 2A):

Obtain an I-Vector vector of each of multiple voice samples, and determine a target seed sample in the multiple voice samples.

Respectively calculate a cosine distance between an I-Vector vector of the target seed sample and an I-Vector vector of a target remaining voice sample, the target remaining voice sample being a voice sample other than the target seed sample in the multiple voice samples.

Obtain by means of filtering a target voice sample from the multiple voice samples or the target remaining voice sample at least according to the cosine distance, a cosine distance between an I-Vector vector of the target voice sample and the I-Vector vector of the target seed sample being higher than a first predetermined threshold.

The storage medium may be further configured to store program code used to perform the following step: repeatedly performing the following operations, until the target seed sample is determined: respectively calculating cosine distances between an I-Vector vector of the current seed sample and I-Vector vectors of current remaining voice samples, where the current remaining voice samples are voice samples other than the current seed sample in the multiple voice samples; determining whether a difference between a first average value and a second average value is less than a second predetermined threshold, where the first average value is an average value of the cosine distances between the I-Vector vector of the current seed sample and the I-Vector vectors of the current remaining voice samples; the second average value is an average value of cosine distances between an I-Vector vector of the seed sample in the last round and I-Vector vectors of the remaining voice samples in the last round; and the remaining voice samples in the last round are voice samples other than the seed sample in the last round in the multiple voice samples; and determining the current seed sample as the target seed sample if the difference is less than the second predetermined threshold; or using the current seed sample as the seed sample in the last round, selecting a voice sample from the current remaining voice samples, splicing the selected voice sample into the current seed sample, and using the current remaining voice samples as the remaining voice samples in the last round if the difference is greater than or equal to the second predetermined threshold.

The storage medium may be further configured to store program code used to perform the following steps: sorting the current remaining voice samples in ascending order of the cosine distances; and selecting one or more top ranked voice samples from the current remaining voice samples after the sorting, where audio duration of the current seed sample into which the one or more top ranked voice samples are spliced is a third predetermined threshold.

The storage medium may be further configured to store program code used to perform the following steps: determining whether a quantity of target remaining voice samples is greater than or equal to a fourth predetermined threshold; and obtaining by means of filtering the target voice sample from the target remaining voice sample according to the cosine distance when the quantity of target remaining voice samples is greater than or equal to the fourth predetermined threshold; or obtaining by means of filtering the target voice sample from the multiple voice samples according to the cosine distance and the cosine distance between the I-Vector vector of the target voice sample and the I-Vector vector of the target seed sample when the quantity of target remaining voice samples is less than the fourth predetermined threshold.

The storage medium may be further configured to store program code used to perform the following steps: obtaining a voice feature parameter of each of the multiple voice samples; and obtaining the I-Vector vector of each voice sample by using an I-Vector matrix completed by means of pre-training, where the I-Vector matrix is used to indicate the I-Vector vector corresponding to the voice feature parameter of the voice sample.

The storage medium may be further configured to store program code used to perform the following steps: obtaining a voice feature parameter of each of multiple voice samples used to train the I-Vector matrix; extracting, according to the voice feature parameter of each of the multiple voice samples used to train the I-Vector matrix, a GSV from a GMM completed by means of pre-training, where the GMM is a model obtained by means of training by using a voice feature parameter of each of multiple voice samples used to train the GMM; and training the I-Vector matrix by using the GSV.

The storage medium may be further configured to store program code used to perform the following steps: processing the voice samples into PCM signals whose sampling rates are respectively a first sampling rate and a second sampling rate; extracting the voice feature parameters from the PCM signals; and performing energy detection and normalization processing on the voice feature parameters.

For a specific example in this exemplary embodiment, refer to examples described in the foregoing exemplary embodiments, and details are not described in this exemplary embodiment again.

In this exemplary embodiment, the storage medium may include, but is not limited to, any medium that can store program code, such as a USB flash drive, a ROM, a RAM, a removable hard disk, a magnetic disk, or an optical disc.

The sequence numbers of the foregoing exemplary embodiments are merely for description purpose but do not indicate the preference of the exemplary embodiments.

When the integrated unit in the exemplary embodiments is implemented in the form of a software functional unit and sold or used as an independent product, the integrated unit may be stored in the computer-readable storage medium. Based on such an understanding, the technical solutions of the exemplary embodiments essentially, or the part contributing to the existing technology, or all or some of the technical solutions may be implemented in a form of a software product. The computer software product is stored in a storage medium and includes several instructions for instructing one or more computer devices (which may be a PC, a server, a network device, or the like) to perform all or some of the steps of the method described in the exemplary embodiments.

In the foregoing exemplary embodiments, the description of each exemplary embodiment has respective focuses. For a part that is not described in detail in an exemplary embodiment, refer to related descriptions in other exemplary embodiments.

In the several exemplary embodiments provided, it should be understood that the disclosed client may be implemented in other manners. The described apparatus embodiment is merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the exemplary embodiments may be integrated into one processing unit, or each of the units may exist alone physically, or two or more units are integrated into one unit. The integrated unit may be implemented in a form of hardware, or may be implemented in a form of a software functional unit.

The foregoing descriptions are merely some implementations of the exemplary embodiments. It should be noted that a person of ordinary skill in the art may make several improvements or refinements without departing from the principle of the exemplary embodiments and the improvements or refinements shall fall within the protection scope of the attached claims.

What is claimed is:

1. A method comprising:
obtaining an I-Vector vector of each of a plurality of voice samples, and selecting one of the plurality of voice samples as a target seed sample;
respectively calculating a first cosine distance between the I-Vector vector of the target seed sample and the I-Vector vector of each of remaining voice samples of the plurality of voice samples, the target remaining voice samples being voice samples other than the target seed sample in the plurality of voice samples; and
filtering the plurality of voice samples according to the first cosine distances to obtain at least one target voice sample, whose first cosine distance is greater than a first threshold.

2. The method according to claim 1, wherein:
a current seed sample is initialized as a result obtained by splicing at least one of the plurality of voice samples;
a seed sample in a last round and remaining voice samples in the last round are initialized as empty; and
the determining the target seed sample comprises repeatedly performing the following operations, until the target seed sample is determined:
respectively calculating second cosine distances between an I-Vector vector of the current seed sample and I-Vector vectors of current remaining voice samples, wherein the current remaining voice samples are voice samples other than the current seed sample in the plurality of voice samples;
determining whether a difference between a first average value and a second average value is less than a second threshold,
the first average value being an average value of the second cosine distances between the I-Vector vector of the current seed sample and the I-Vector vectors of the current remaining voice samples, and
the second average value being an average value of second cosine distances between an I-Vector vector of the seed sample in the last round and I-Vector vectors of the remaining voice samples in the last round, the remaining voice samples in the last round being voice samples other than the seed sample in the last round in the plurality of voice samples; and in response to the difference being less than the second threshold determining the current seed sample as the target seed sample; and in response to the difference being greater than or equal to the second threshold, using the current seed sample as the seed sample in the last round, selecting a voice sample from the current remaining voice samples, splicing the selected voice sample into the current seed sample, and using the current remaining voice samples as the remaining voice samples in the last round.

3. The method according to claim 2, wherein the selecting the voice sample from the current remaining voice samples comprises:

sorting the current remaining voice samples in ascending order of the second cosine distances; and selecting one or more top ranked voice samples from the current remaining voice samples after the sorting, wherein audio duration of the current seed sample into which the one or more top ranked voice samples are spliced is a third threshold.

4. The method according to claim 1, wherein the filtering comprises:

determining whether a quantity of target remaining voice samples is greater than or equal to a fourth threshold; and in response to the quantity being greater than or equal to the fourth threshold, filtering the target voice sample from the target remaining voice sample according to the first cosine distance; and in response to the quantity being less than the fourth threshold, filtering the target voice sample from the plurality of voice samples according to the first cosine distance and a second cosine distance between the I-Vector vector of the target voice sample and the I-Vector vector of the target seed sample.

5. The method according to claim 1, wherein the obtaining an I-Vector vector comprises:

obtaining a voice feature parameter of each of the plurality of voice samples; and obtaining the I-Vector vector of each voice sample by using an I-Vector matrix completed by pre-training, wherein the I-Vector matrix is used to indicate the I-Vector vector corresponding to the voice feature parameter of the voice sample.

6. The method according to claim 5, wherein the pre-training comprises:

obtaining a voice feature parameter of each of a plurality of voice samples used to train the I-Vector matrix;

extracting, according to the voice feature parameter of each of the plurality of voice samples used to train the I-Vector matrix, a Gaussian supervector (GSV) from a Gaussian mixture model (GMM) completed by pre-training, wherein the GMM is a model obtained by training using a voice feature parameter of each of the plurality of voice samples used to train the GMM; and training the I-Vector matrix using the GSV.

7. The method according to claim 5, wherein the obtaining voice feature parameters comprises:

processing the plurality of voice samples into a plurality of pulse code modulation (PCM) signals whose sampling rates are respectively a first sampling rate and a second sampling rate;

extracting the voice feature parameters from the plurality of PCM signals; and performing energy detection and normalization processing on the voice feature parameters that are extracted.

8. The method of claim 1, wherein the plurality of voice samples are included in a single voice print.

9. An apparatus comprising:

at least one memory configured to store computer program code; and at least one processor configured to access the at least one memory and operate according to the computer program code, the computer program code including:

vector code configured to cause the at least one processor to obtain an I-Vector vector of each of a plurality of voice samples, and select one of the plurality of voice samples as a target seed sample;

cosine distance code configured to cause the at least one processor to respectively calculate a cosine distance between the I-Vector vector of the target seed sample and the I-Vector vector of each of remaining voice samples, the target remaining voice samples being voice samples other than the target seed sample in the plurality of voice samples;

filtering code configured to cause the at least one processor to filter the plurality of voice samples according to the first cosine distances to obtain at least one target voice sample, whose first cosine distance is greater than a first threshold.

10. The apparatus according to claim 9, wherein:

a current seed sample is initialized as a result obtained by splicing at least one of the plurality of voice samples;

a seed sample in a last round and remaining voice samples in the last round are initialized as empty; and the computer program code causes the at least one processor to repeatedly perform the following operations, until the target seed sample is determined:

respectively calculating second cosine distances between an I-Vector vector of the current seed sample and I-Vector vectors of current remaining voice samples, wherein the current remaining voice samples are voice samples other than the current seed sample in the plurality of voice samples;

determining whether a difference between a first average value and a second average value is less than a second threshold, the first average value being an average value of the second cosine distances between the I-Vector vector of the current seed sample and the I-Vector vectors of the current remaining voice samples, and the second average value being an average value of second cosine distances between an I-Vector vector of the seed sample in the last round and I-Vector vectors of the remaining voice samples in the last round, the remaining voice samples in the last round being voice samples other than the seed sample in the last round in the plurality of voice samples; and in response to the difference being less than the second threshold determining the current seed sample as the target seed sample; and in response to the difference being greater than or equal to the second threshold, using the current seed sample as the seed sample in the last round, selecting a voice sample from the current remaining voice samples, splicing the selected voice sample into the current seed sample, and using the current remaining voice samples as the remaining voice samples in the last round.

11. The apparatus according to claim 10, wherein the computer program code causes the at least one processor select the voice sample by causing the at least one processor to:
   sort the current remaining voice samples in ascending order of the second cosine distances; and
   select one or more top ranked voice samples from the current remaining voice samples after the sorting, wherein audio duration of the current seed sample into which the one or more top ranked voice samples are spliced is a third threshold.

12. The apparatus according to claim 9, wherein the computer program code causes the at least one processor filter by causing the at least one processor to:
   determine whether a quantity of target remaining voice samples is greater than or equal to a fourth threshold;
   in response to the quantity being greater than or equal to the fourth threshold, filtering the target voice sample from the target remaining voice sample according to the first cosine distance; and
   in response to the quantity being less than the fourth threshold, filtering the target voice sample from the plurality of voice samples according to the first cosine distance and a second cosine distance between the I-Vector vector of the target voice sample and the I-Vector vector of the target seed sample.

13. The apparatus according to claim 9, wherein the computer program code causes the at least one processor to obtain the I-Vector vector by causing the at least one processor to:
   obtain a voice feature parameter of each of the plurality of voice samples; and
   obtain the I-Vector vector of each voice sample by using an I-Vector matrix completed by means of pre-training, wherein the I-Vector matrix is used to indicate the I-Vector vector corresponding to the voice feature parameter of the voice sample.

14. The apparatus according to claim 13, wherein the computer program code causes the at least one processor to pre-train the I-Vector matrix by causing the at least one processor to:
   obtain a voice feature parameter of each of plurality of voice samples used to train the I-Vector matrix;
   extract, according to the voice feature parameter of each of the plurality of voice samples used to train the I-Vector matrix, a Gaussian supervector (GSV) from a Gaussian mixture model (GMM) completed by pre-training, wherein the GMM is a model obtained by training using a voice feature parameter of each of the plurality of voice samples used to train the GMM; and
   train the I-Vector matrix using the GSV.

15. The apparatus according to claim 13, wherein the computer program code causes the at least one processor to obtain the voice feature parameters by causing the at least one processor to:
   process the plurality of voice samples into a plurality of pulse code modulation (PCM) signals whose sampling rates are respectively a first sampling rate and a second sampling rate;
   extract the voice feature parameters from the plurality of PCM signals; and
   perform energy detection and normalization processing on the voice feature parameters that are extracted.

16. The apparatus of claim 9, wherein the plurality of voice samples are included in a single voiceprint.

17. A non-transitory computer-readable storage medium that stores computer program code that, when executed by a processor of a calculating apparatus, causes the calculating apparatus to perform:
   obtaining an I-Vector vector of each of a plurality of voice samples, and selecting one of the plurality of voice samples as a target seed sample;
   respectively calculating a first cosine distance between the I-Vector vector of the target seed sample and the I-Vector vector of each of remaining voice samples of the plurality of voice samples, the target remaining voice samples being voice samples other than the target seed sample in the plurality of voice samples; and
   filtering the plurality of voice samples according to the first cosine distances to obtain at least one target voice sample, whose first cosine distance is greater than a first threshold.

18. The non-transitory computer-readable storage medium of claim 17, wherein the plurality of voice samples are included in a single voiceprint.

* * * * *